(12) United States Patent
Dean et al.

(10) Patent No.: US 10,733,172 B2
(45) Date of Patent: *Aug. 4, 2020

(54) METHOD AND COMPUTING DEVICE FOR MINIMIZING ACCESSES TO DATA STORAGE IN CONJUNCTION WITH MAINTAINING A B-TREE

(71) Applicant: WORKIVA INC., Ames, IA (US)

(72) Inventors: Timothy Dean, Belgrade, MT (US); Houston King, Bozeman, MT (US); Ryan Heimbuch, Belgrade, MT (US)

(73) Assignee: WORKIVA INC., Ames, IA (US)

( * ) Notice: Subject to any disclaimer, the term of this patent is extended or adjusted under 35 U.S.C. 154(b) by 307 days.

This patent is subject to a terminal disclaimer.

(21) Appl. No.: 15/834,876

(22) Filed: Dec. 7, 2017

(65) Prior Publication Data

US 2018/0096017 A1    Apr. 5, 2018

Related U.S. Application Data

(63) Continuation of application No. 15/495,261, filed on Apr. 24, 2017, now Pat. No. 9,928,266.
(Continued)

(51) Int. Cl.
*G06F 16/23* (2019.01)
*H04L 12/861* (2013.01)
(Continued)

(52) U.S. Cl.
CPC ........ *G06F 16/235* (2019.01); *G06F 16/2246* (2019.01); *H04L 49/9084* (2013.01); *H04L 67/1097* (2013.01); *H04L 67/10* (2013.01)

(58) Field of Classification Search
CPC .................................................. G06F 16/2246
See application file for complete search history.

(56) References Cited

U.S. PATENT DOCUMENTS

| 5,920,857 A | 7/1999 | Rishe et al. |
| 6,026,406 A * | 2/2000 | Huang ................ G06F 16/2343 |

(Continued)

OTHER PUBLICATIONS

Achakeev et al., "Efficient bulk updates on multiversion b-trees." Proceedings of the VLDB Endowment 6.14, 2013, pp. 1834-1845.
(Continued)

*Primary Examiner* — William Spieler
(74) *Attorney, Agent, or Firm* — Faegre Drinker Biddle & Reath LLP

(57) ABSTRACT

Methods for modifying a B-tree are disclosed. According to an implementation, a computing device receives requests for updates to a B-tree, groups two or more of the requests into a batch that are destined for a particular node on the B-tree, but refrains from modifying the node until a buffer of a node above it is full (or will be full with this batch of requests). Once the buffer is full, the computing device provides the requests to that particular node. The techniques described herein may result in the computing device carrying out fewer of reads from and writes to storage than existing B-tree maintenance techniques, thereby saving time and bandwidth. Reducing the number of reads and writes also saves money, particularly when the storage is controlled by a third party SaaS provider that charges according to the number of transactions.

20 Claims, 15 Drawing Sheets

Related U.S. Application Data

(60) Provisional application No. 62/345,241, filed on Jun. 3, 2016.

(51) Int. Cl.
*G06F 16/22* (2019.01)
*H04L 29/08* (2006.01)

(56) References Cited

U.S. PATENT DOCUMENTS

| | | | |
|---|---|---|---|
| 6,148,342 A | 11/2000 | Ho | |
| 6,381,605 B1* | 4/2002 | Kothuri | G06F 16/2264 |
| 7,716,189 B1 | 5/2010 | Panchbudhe et al. | |
| 8,121,921 B2 | 2/2012 | LaQuinta et al. | |
| 8,145,686 B2 | 3/2012 | Raman et al. | |
| 8,185,551 B2* | 5/2012 | Kuszmaul | G06F 11/1471 |
| | | | 707/790 |
| 8,364,648 B1 | 1/2013 | Sim-Tang | |
| 8,423,575 B1 | 4/2013 | Alcorn et al. | |
| 8,478,765 B2 | 7/2013 | Barton et al. | |
| 8,489,638 B2* | 7/2013 | Kuszmaul | G06F 11/1471 |
| | | | 707/790 |
| 8,606,671 B2 | 12/2013 | Lee et al. | |
| 8,781,936 B2 | 7/2014 | Riley | |
| 8,996,563 B2* | 3/2015 | Bender | G06F 9/546 |
| | | | 707/769 |
| 9,081,501 B2* | 7/2015 | Asaad | G06F 15/76 |
| 2008/0307181 A1* | 12/2008 | Kuszmaul | G06F 11/1471 |
| | | | 711/164 |
| 2010/0037161 A1 | 2/2010 | Stading et al. | |
| 2011/0246503 A1* | 10/2011 | Bender | G06F 9/546 |
| | | | 707/769 |
| 2012/0254253 A1* | 10/2012 | Kuszmaul | G06F 11/1471 |
| | | | 707/797 |
| 2014/0006244 A1 | 1/2014 | Crowley et al. | |
| 2014/0188790 A1 | 7/2014 | Hunter | |
| 2015/0347477 A1* | 12/2015 | Esmet | G06F 16/13 |
| | | | 707/744 |
| 2015/0370860 A1* | 12/2015 | Bender | G06F 9/546 |
| | | | 707/609 |

OTHER PUBLICATIONS

Arge, "The Buffer Tree: A New Technique for Optimal I/O Algorithms," Basic Research in Computer Science, BRICS Report Series, RS-96-28, Aug. 1996, 37 pages.

Arge, "The Buffer Tree: A Technique for Designing Batched External Data Structures," Algorithmica, Springer-Verlag New York, Inc., 2003, vol. 37, pp. 1-24.

Blelloch, "Algorithms in the Real World," 2010, accessed Jun. 28, 2017 at http://www.cs.cmu.edu/-guyb/realworld/slidesS12/localityAssign.pdf, 3 pages.

Bender et al., "Streaming Cache-Oblivious B-Trees," MIT CSAIL Research Abstracts, 2007, retrieved from internet at http://publications.csail.mit.edu/abstracts07/jfineman/jfineman.html on Sep. 29, 2017, 3 pages.

Brodal et al., "Lower Bounds for External Memory Dictionaries," Alcom-FT Technical Report Series, ALCOMFT-TR-03-75, Aarhus, Nov. 2003, pp. 1-13.

Dillabaugh, "Buffered R-Tree, Apr. 26, 2007," accessed Jun. 27, 2017 at http://cglab.ca/-cdillaba/comp5409_project/Buffered_R_Tree_html, 3 pages.

Hedenfalk, "how the append-only btree works," accessed Jun. 28, 2017 at http://www.bzero.se/ldapd/btree.html, 2 pages.

Github, "Persistent Sorted Maps and Sets with Log-Time Rank Queries," retrieved from internet at https://github.com/clojure/data/avl. on Sep. 29, 2017, 2013-2016, 4 pages.

Holte, "Insertion Into a B-Tree," accessed Jun. 28, 2017 at https://webdocs.cs.ualberta.ca/-holte/T26/ins-b-tree.html, 4 pages.

Jannink, "Implementing Deletion in B+ – Trees," ACM SIGMOD Newsletter, ACM New York, NY, US, Mar. 1995, vol. 24(1), pp. 33-38.

Kuszmaul et al., "Write-Optimization in B-Trees," Tokutek, Sep. 23, 2013, 22 pages.

Pendleton, "A nice short explanation of how a copy-on-write BTree works," Aug. 24, 2012, accessed Jun. 28, 2017 at http://bryanpendleton.blogspot.com/2012/08/a-nice-short-explanation-of-how-copy-on.html; 2 pages.

Okasaki, "Purely Functional Data Structures," Thesis, School of Computer Science, Carnegie Mellon University, Pittsburgh, PA, Sep. 1996, 162 pages.

Stack Overflow, "Clojure: immutability and persistence," retrieved from internet at https://stackoverflow.com/questions/27152555/clojure-immunability-and-persistence on Sep. 29, 2017, Nov. 2014, 2 pages.

Todd, "GUIDs as fast primary keys under multiple databases," retrieved from internet at http://www.codeproject.com/Articles/388157/GUIDs-astast-primary-leys-under-multiple-database, Mar. 15, 2013, 11 pages.

Twigg et al., "Stratified B-trees and Versioned Dictionaries." HotStorage, 2011, 8 pages.

* cited by examiner ably high vol-
METHOD AND COMPUTING DEVICE FOR MINIMIZING ACCESSES TO DATA STORAGE IN CONJUNCTION WITH MAINTAINING A B-TREE

CROSS-REFERENCE TO RELATED APPLICATIONS

This application is a continuation of U.S. patent application Ser. No. 15/495,261, filed Apr. 24, 2017, which claims the priority benefit of U.S. Provisional Patent Application 62/345,241 filed Jun. 3, 2016. Both documents are incorporated herein by reference in their entirety.

TECHNICAL FIELD

The disclosure relates generally to data storage access and, more particularly, to a method and computing device for minimizing accesses to data storage in conjunction with maintaining a B-tree.

BACKGROUND

Software architects often have to deal with problems associated with the cost (in terms of both time and processing resources) of accessing electronic data storage. This is particularly true with high-latency (and typically high volume) storage media, such as magnetic hard disk memory. In general, the more times a processor is required to access high-latency electronic data storage in carrying out an operation, the more time and processing resources the operation will consume.

With the widespread adoption of cloud-based storage, the time cost of accessing electronic data storage has risen considerably. This is because cloud-based storage adds the additional delay of distance and intervening networks (like networks that make up the internet). Furthermore, some cloud-based storage providers charge customers based on the number of accesses, thereby adding yet another, more direct cost.

DRAWINGS

While the appended claims set forth the features of the present techniques with particularity, these techniques may be best understood from the following detailed description taken in conjunction with the accompanying drawings of which:

DESCRIPTION

Methods for modifying a B-tree are disclosed. According to an implementation, a computing device receives requests for updates to a B-tree, groups two or more of the requests into a batch that is destined for a particular node on the B-tree, but refrains from modifying that node until a buffer of a node above it is full (or will be full with this batch of requests). Once the buffer is full, the computing device provides the requests to that particular node. The techniques described herein result in the computing device carrying out fewer reads from and writes to storage than existing B-tree maintenance techniques, thereby saving time and bandwidth. Reducing the number of reads and writes also saves money, particularly when the storage is controlled by a third party SaaS provider that charges according to the number of transactions.

Figure 1:
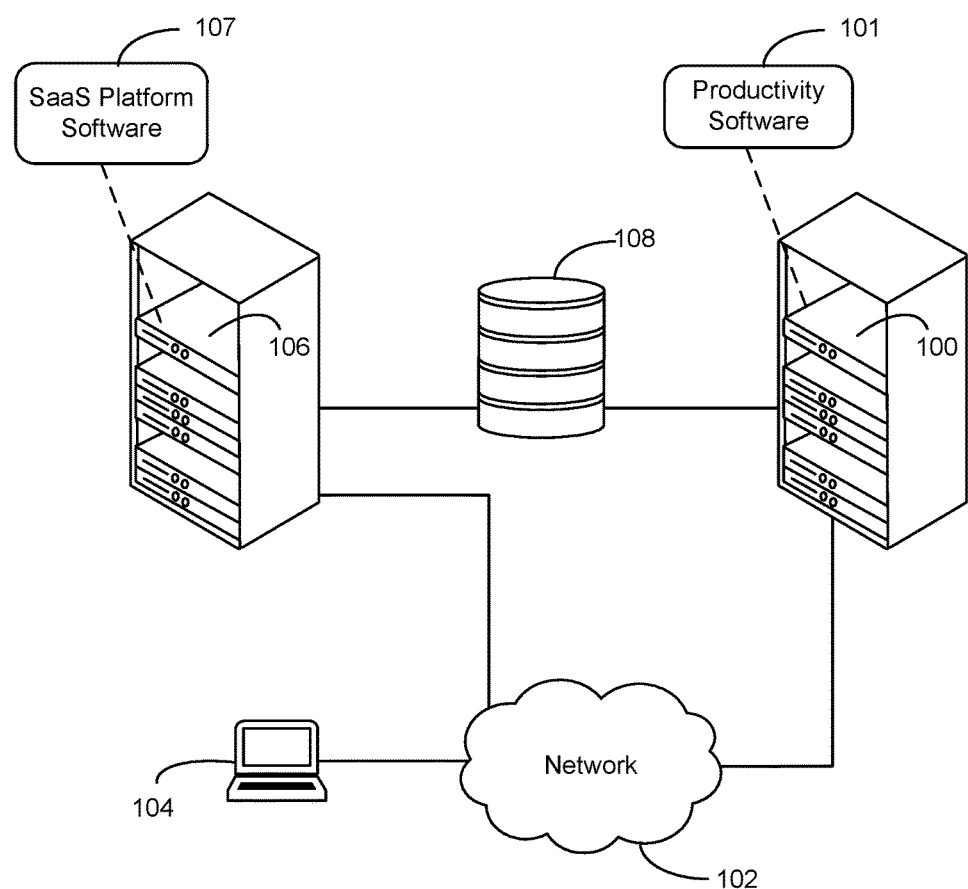
FIG. 1 is a block diagram illustrating an example networking environment in which various embodiments of the disclosure may be employed.

Various embodiments of the disclosure are implemented in a computer networking environment. Turning to FIG. 1, an example of such an environment is shown. A first computing device 100 (e.g., a hardware server or a cluster of hardware servers) is communicatively linked to a network 102. Possible implementations of the network 102 include a local-area network, a wide-area network, a private network, a public network (e.g., the internet), or any combination of these. The network 102 may include both wired and wireless components. Also communicatively linked to the network 102 are a second computing device 104 (e.g., a client device) and a third computing device 106 (e.g., a hardware server or a cluster of hardware servers). It is to be understood that the various embodiments may be carried out on the first computing device 100, the second computing device 104, or other computing devices not depicted, with the second computing device 104 accessing the first computing device 100 via a thin, web-based client. In an embodiment, the first computing device 100 executes productivity software 101 (e.g., a document editing application, a spreadsheet application, etc.) and the third computing device 106 executes software as a service ("SaaS") platform software 107. The first computing device 101 and the third computing device 106 are communicatively linked to a media storage device 108 (e.g., a memory or a redundant array of independent disks). Although FIG. 1 depicts the media storage device 108 as a single device, in fact, the media storage device 108 may represent a cloud storage service including multiple storage devices. In general, the media storage device 108 may be implemented as a single computing device or as multiple computing devices working together.

In another embodiment, the productivity software 101 and the SaaS platform software 107 are executed on the same computing device (e.g., the first computing device 100 or the third computing device 106). For example, the productivity software 101 resides on one partition of the first computing device 100 while the SaaS platform software 107 resides on another partition of the first computing device 100. In other embodiments, portions of the productivity software 101 may be executed on both the first computing device 100 and the third computing device 106, and/or portions of the SaaS platform software 107 may be executed on both the first computing device 100 and the third computing device 106. With such network configurations, the second computing device 104 is configured to access the computing device or devices on which the productivity software 101 resides.

Figure 2:
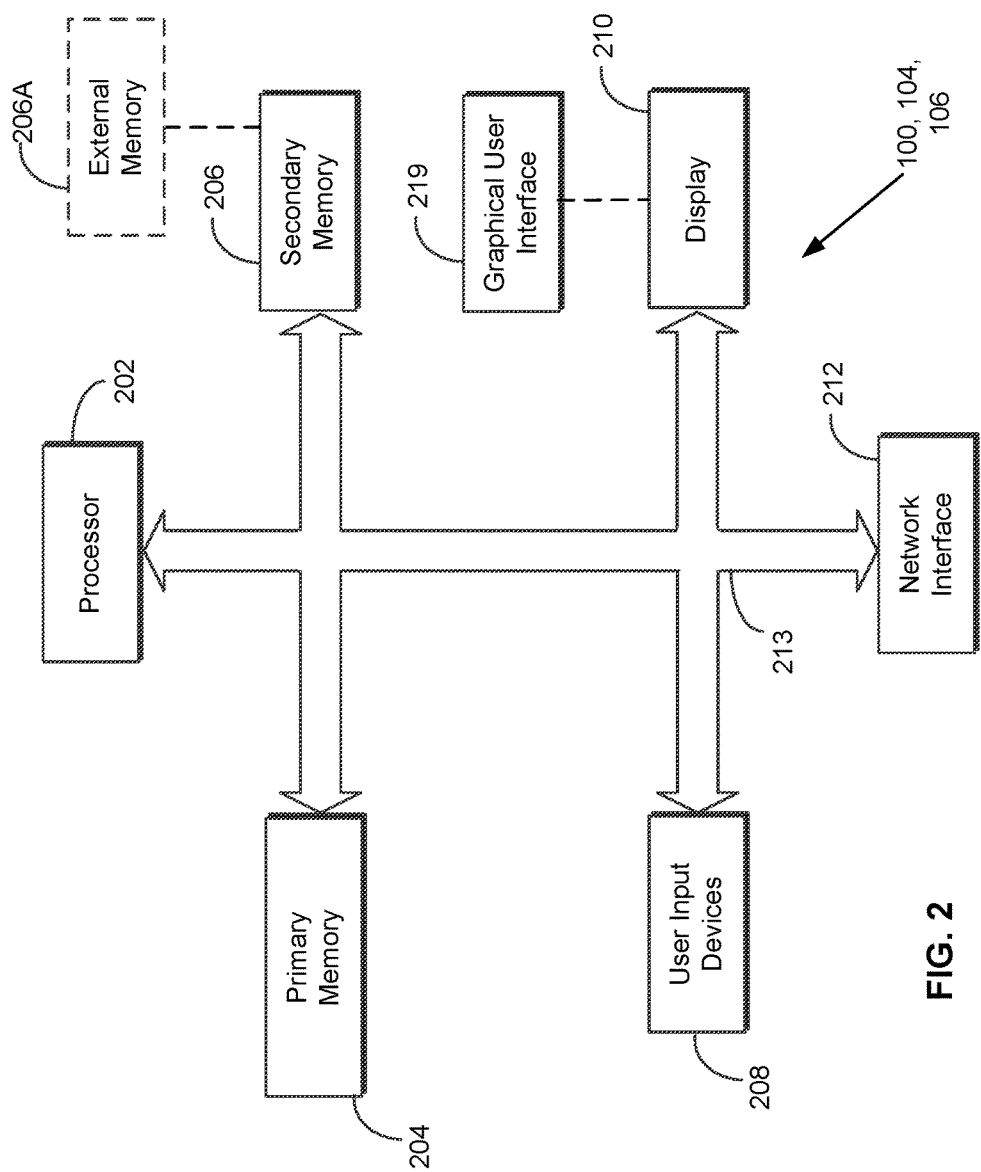
FIG. 2 is a block diagram of a computing device, according to an embodiment.

In one implementation, one or more of the computing devices of FIG. 1 (including the media storage device 108) have the general architecture shown in FIG. 2. The computing device includes processor hardware 202 (e.g., a microprocessor, controller, or application-specific integrated circuit) (hereinafter "processor 202"), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless). Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

The memories 204 and 206 store instructions executable by the processor 202 and data. The term "local memory" as used herein refers to one or both the memories 204 and 206 (i.e., memory accessible by the processor 202 within the computing device). In some embodiments, the secondary memory 206 is implemented as, or supplemented by, an external memory 206A. The media storage device 108 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a report on the display device 210, and which permits a user to make inputs into the report via the user input devices 208.

As discussed above, the disclosure is generally directed to methods and devices for maintaining a B-tree. As used herein, a "B-tree" is a tree data structure that describes relationships among data, and can be searched and modified by a computing device having the appropriate set of permissions. Examples of B-trees include B+ trees, B* trees, and BC-trees. A node of a B-tree may have no children (in which case the node is said to be a "leaf node"), or may have any number of child nodes (in which case the node is said to be a "branch node"). A node that has no parent is said to be a "root node." Each branch node may include metadata that the computing device uses to route any sort of interaction with the B-tree and, ultimately, with the leaf nodes. Possible types of interactions between the B-tree (or a process tasked to maintain the B-tree) and other entities (e.g., in response to requests or instructions from other entities) include node and data retrieval, node and data insertion, node and data deletion, and node and data restructuring (e.g., so that structural changes to the way data is stored would propagate gradually as data is used, rather than requiring a complete rewrite of a tree all at once). "Data" in this context refers to anything stored in a node, such as element identifiers ("IDs"), attributes of the node, and values stored in the node.

Each branch node includes information (e.g., a maximum value and a minimum value) that may help a computing device optimize the routing of requests for interaction with the B-tree. A branch node may also include information about its child nodes/branches, such as a map referred to herein as a "cap-key map" or "map." The cap-key map includes a set of entries, in which each entry maps a key to a value. The entries are ordered from the lowest to the highest key. A computing device uses the map to determine the branch down which it will send incoming data. A branch node also includes a buffer (or pointer thereto) for holding interaction instructions. In an embodiment, the computing device groups interaction requests within the buffer according to which branch should receive the requests when the buffer is flushed.

In order to make changes to the B-tree, a computing device (such as one or more of the computing devices shown in FIG. 1) retrieves (reads) the appropriate nodes from a media storage device (such as the media storage device 108), makes the appropriate updates (changes) to the node or nodes, and stores the updated node or nodes in the media storage device (i.e., writes the updated node or nodes to the media storage device). However, in many cases the node or nodes that need to be changed are located multiple layers down the B-tree. The computing device is generally required to access the B-tree by the root node and then successively retrieve further nodes (e.g., by successively retrieving references (such as pointers) to such further nodes). As a result, in order to make a change to a node in the B-tree, the computing device may need to perform multiple read and write operations.

Figure 3:
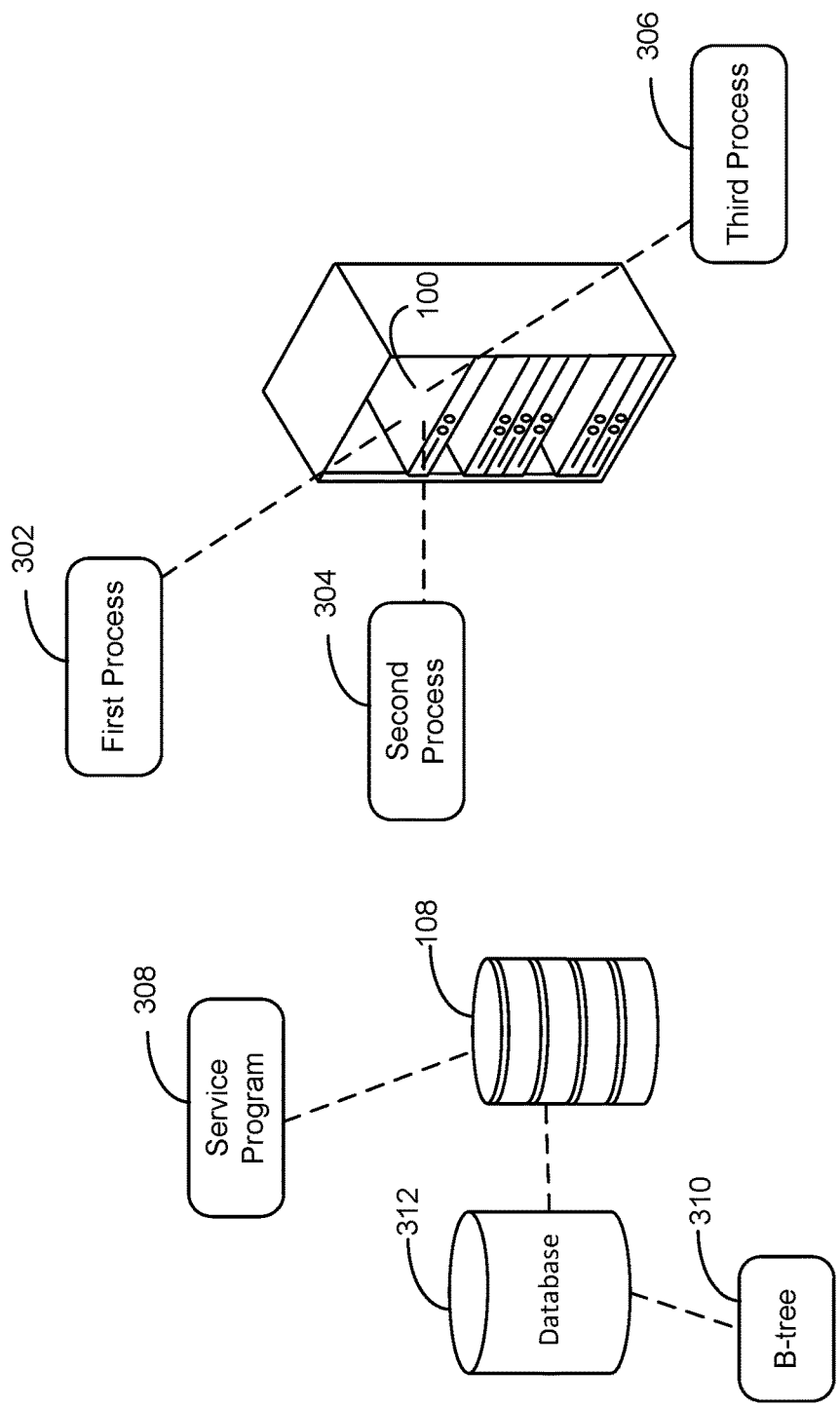
FIG. 3 is a block diagram of a network environment used to illustrate various techniques described herein.

Turning to FIG. 3, an example network configuration is shown. This network configuration will be referred to throughout this disclosure in order to illustrate various embodiments. In this network configuration, processor hardware of the first computing device 100 executes a first process 302, a second process 304, and a third process 306. Each of these processes may be executed by the same processor hardware on the first computing device 100 or by separate processor hardware on the first computing device 100. The first process 302 communicates with a service program 308 that the media storage device 108 executes. Thus, when the present disclosure refers to the first process 302 communicating or otherwise interacting with the service program 308, it is, in fact, processor hardware on the first computing device 100 that communicates (e.g., via the internet) with processor hardware on the media storage device 108. Residing on the media storage device 108 (in long-term memory, for example) is a B-tree 310. The first process 302 is responsible for maintaining the B-tree 310. Also residing on the media storage device 108 (in long-term memory, for example) is a database 312. The service program 308 is responsible for maintaining the database 312. In doing so, the service program 308 handles incoming requests for reads from and writes to the database 312. The second process 304 and the third process 306 are each "clients" of the first process 302 with respect to maintenance of the B-tree 310 in the sense that the second process 304 and third process 306 send requests for the first process 302 to make updates to the B-tree 310. Such update requests may be in the form of 'insert' and 'delete' messages. It is to be understood, however, that such updates might be requested by multiple different processes, one or more of which might be executing on the first computing device itself or on other, separate computing devices. The depictions of the second and third processes in FIG. 3 are intended for illustrative purposes only.

Turning to FIGS. 4A-4H, an example of how the first computing device 100 ("computing device 100") maintains the B-tree 310 according to an embodiment will now be described. For this example, assume that in the B-tree 310: (a) each non-leaf node has a buffer, (b) the maximum number of requests ("MaxRequests") that can be stored in each branch node's buffer is four, (c) the maximum number of values ("MaxValues") permitted to be stored in each leaf node is four, and (d) the maximum number of children ("MaxChildren") each branch node is permitted to have is three. It is to be understood that these values are merely illustrative. For example, the values could be derived via algorithm, e.g., MaxChildren=SQRT(Count(tree size)). Further assume that each branch node includes a map that contains references (e.g., pointers or unique identifiers) to that branch node's children as well as the ranges assigned to the children, so that by analyzing the node while a copy of the node resides in the memory of the computing device 100 (also referred to herein as "local memory"), the first process 302 can determine which child node should be updated and use the appropriate reference (obtained from the branch node's map) to request the child node from the service program 308.

Figure 4A:
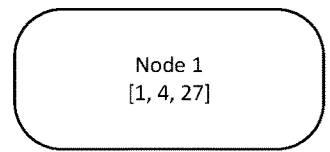
FIGS. 4A-4H illustrate how a B-tree is maintained in a way that minimizes the number of nodes read from and written to data storage, according to an embodiment.
Figure 4B:
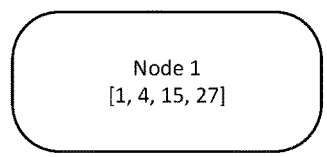

In FIG. 4A, the B-tree 310 starts with a node that will be referred to as 'Node 1.' Node 1 at this point in time is both a root node and a leaf node. Node 1 holds the values 1, 4, and 27. The first process 302 receives an update request of 'insert 15' from the second process 304. The computing device 100 responds by requesting Node 1 from the service program 308 (e.g., by transmitting a "read" request to the service program 308). Under the direction of the service program 308, the media storage device 108 responds by transmitting Node 1 to the computing device 100. The computing device 100 stores Node 1 in its local memory. Because adding 15 to Node 1 would not cause the number of values ("Values") to exceed MaxValue, the computing device 100 adds 15 to Node 1 (within the local memory) and sends the modified Node 1 to the media storage device 108 (e.g., by transmitting a "write" request to the media storage device 108 via the service program 308). The media storage device 108 responds by modifying the B-tree 310 with the modified Node 1. After the media storage device 108 modifies the B-tree 310, the B-tree 310 is structured as shown in FIG. 4B. For ease of description, it will be assumed that the service program 308 controls the actions of the media storage device (either directly or indirectly e.g., via commands to an application programming interface provided by a cloud-based storage service) and the process will simply be referred to as the service program 308 carrying out retrieval and storage activities.

Figure 4C:
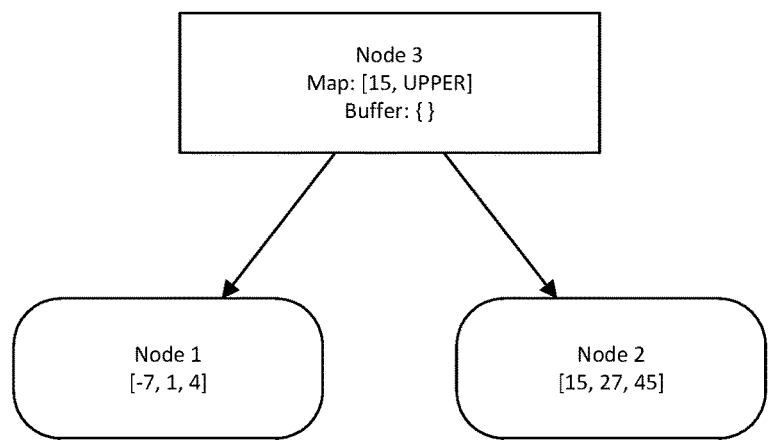

Next, the first process 302 receives two update requests from the second process 304: 'insert −7' and 'insert 45.' In response, the first process 302 requests Node 1 from the service program 308. The service program 308 responds by transmitting Node 1 to the first process 302. The first process 302 determines that adding these two values to Node 1 would cause Values to exceed MaxValues. Accordingly, the first process 302 creates two additional nodes within the local memory—Node 2 and Node 3—and makes Node 1 and Node 2 children of Node 3. Node 3 in this case is both a root node and a branch node. The first process 302 assigns a range to each of Node 1 and Node 2 based on the values against which the insert instructions are directed. In this example, the first process 302 will assign Node 1 any value less than 15 to Node 1 and any value greater than or equal to 15 and less than an upper bound. In this example, the upper bound is infinity, which is represented by the term "UPPER" (effectively any value greater than or equal to 15) to Node 2. These parameters are reflected in the map of Node 3, which the first process 302 creates upon determining that Node 3 is a branch node. The first process 302 therefore removes 15 and 27 from Node 1, inserts −7 into Node 1, and inserts 15, 27, and 45 into Node 2 (in local memory). The first process 302 then sends the modified Node 1, as well as the newly-created Nodes 2 and 3 to the service program 308 (e.g., by transmitting a "write" request to the service program 308). The service program 308 responds by modifying the B-tree 310 with the modified Node 1, the new Node 2, and the new Node 3. After the service program 308 modifies the B-tree 310, the B-tree 310 is structured as shown in FIG. 4C.

Figure 4D:
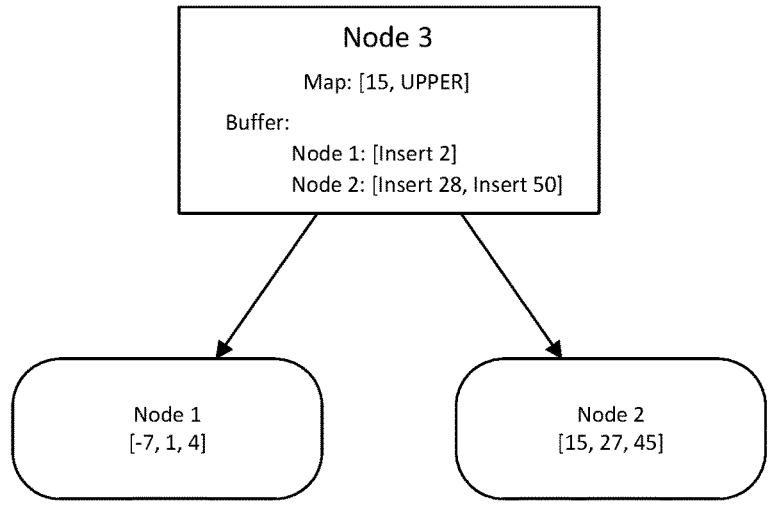

Then, the first process 302 receives three update requests from the third process 306: 'insert 2,' 'insert 28,' and 'insert 50.' In response, the first process 302 requests the root node (Node 3 now) from the service program 308. The service program 308 responds by transmitting Node 3 to the first process 302. The first process 302 determines that the value 2 falls within the range assigned to Node 1 and that the values 28 and 50 belong to range assigned to Node 2. The first process 302 also determines that storing these requests in the buffer for Node 3 would not cause it to be overfull (i.e., BufferValues=<MaxBuffer). As noted above, this determination may be made before or after the requests are stored in the buffer. Accordingly, the first process 302 groups the two values destined for Node 2 into a batch and stores these two values in the buffer of Node 3 so that they are associated with Node 2. For example, the first process 302 may insert the element ID of Node 2 into Node 3's buffer as a sort of 'header' and insert the requests 'insert 28' and 'insert 50' in a location contiguous with the header. The first process 302 also stores the request destined for Node 1 (i.e., 'insert 2') in Node 3's buffer so that it is associated with Node 1. Having finished modifying Node 3, the first process 302 then sends the modified Node 3 to the service program 308 (e.g., by transmitting a "write" request to the service program 308). The service program 308 responds by modifying the B-tree 310 with the modified Node 3. After the service program 308 modifies the B-tree 310, the B-tree 310 is structured as shown in FIG. 4D.

Figure 4E:
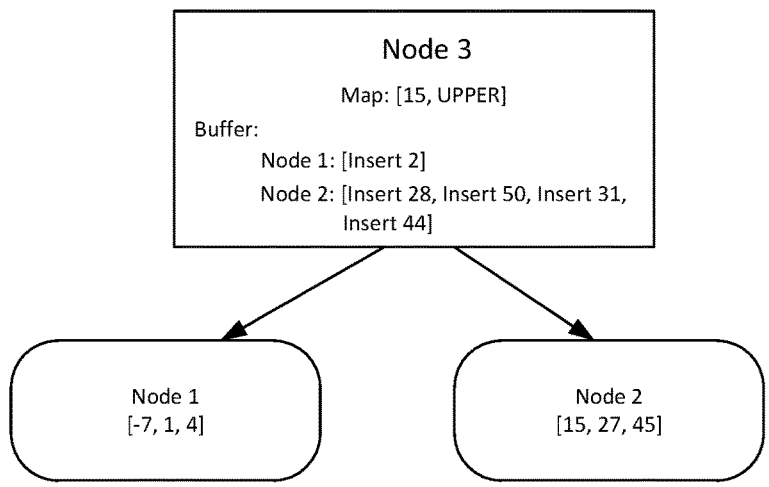

Then, the first process 302 receives one update request from the second process 304: 'insert 31,' and one update request from the third process 306: 'insert 44.' In response, the first process 302 requests the root node (Node 3) from the service program 308. The service program 308 responds by transmitting Node 3 to the first process 302. The first process 302 determines that both of the values 31 and 44 fall within the range assigned to Node 2, and adds the corresponding insertion requests, 'insert 31' and 'insert 44,' to the buffer for Node 3 (associated with Node 2) in local memory. In local memory, the nodes of the B-tree being processed by the first computing device 100 would be structured as shown in FIG. 4E. The first process 302 determines that Node 3's buffer is overfull (i.e., BufferValues>MaxBuffer). Based on this determination, the first process 302 flushes the buffer of Node 3. Alternatively, the first process 302 may make the overfull determination prior to inserting the latest requests into Node 3's buffer, effectively eliminating the need to "overfill" the buffer before determining that overflow will occur.

Figure 4F:
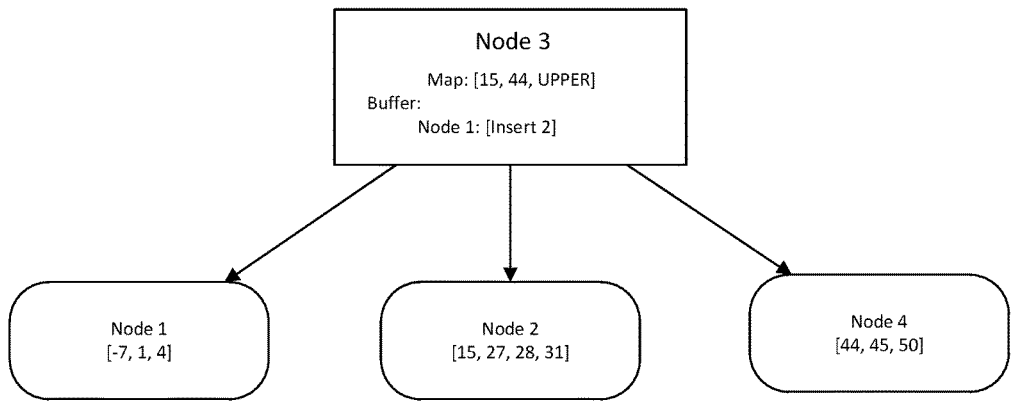

To flush Node 3's buffer in this example, the first process 302 will flush the largest batch which, in this case, is the batch for Node 2—the 'insert 28' request, the 'insert 50' request, the 'insert 31' request, and the 'insert 44' request. In order to carry out this flushing operation, the first process 302 requests Node 2 from the service program 308. The service program 308 responds by transmitting Node 2 to the first process 302. The first process 302 (a) removes the requests (those of the Node 2 batch) from Node 3's buffer, (b) creates a new node—Node 4—since having 4 additional values in Node 2 would cause Values to exceed MaxValues, (c) modifies the map of Node 3 to indicate that Node 2 will be assigned all values that are less than 44 and greater than or equal to 15, (d) removes 45 from Node 2, (e) inserts 28 and 31 into Node 2, and (f) inserts 44, 45, and 50 into Node 4. The first process 302 then sends the modified Node 3, the modified Node 2, and the newly-created Node 4 to the service program 308 (e.g., by transmitting a "write" request to the service program 308). The service program 308 responds by modifying the B-tree 310 with the modified Node 3, the modified Node 2, and the new Node 4 within the media storage device 108. After the service program 308 modifies the B-tree 310, Nodes 1-4 of the B-tree 310 are structured as shown in FIG. 4F.

Figure 4G:
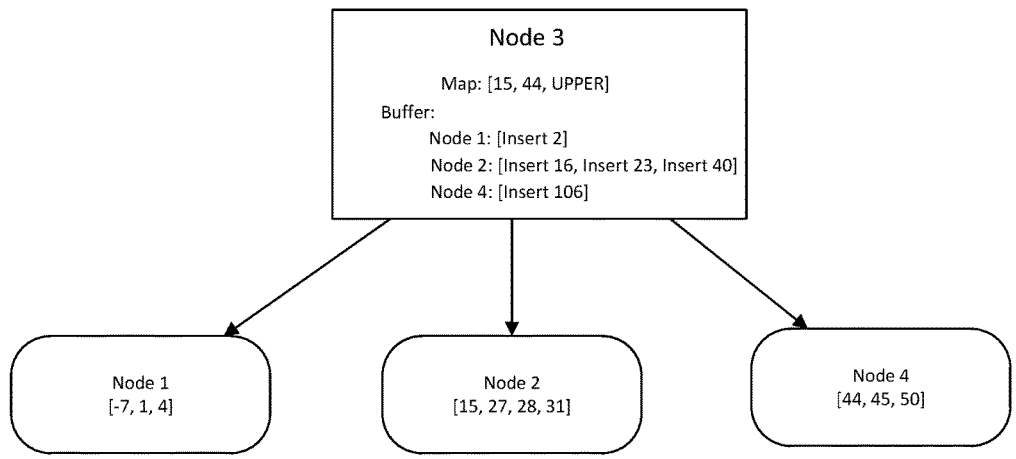

Then, the first process 302 receives four requests from the second process 304: 'insert 16, "insert 23," insert 40,' and 'insert 106.' In response, the first process 302 requests the root node (Node 3) from the service program 308. The service program 308 responds by transmitting Node 3 to the first process 302. The first process 302 determines that the value 106 falls within the range assigned to Node 4, and that the values 16, 23, and 40 fall within the range assigned to Node 2. The first process 302 batches the requests for Node 2 and adds the corresponding insertion requests (for both Node 2 and Node 4) to the buffer for Node 3 (associated with the appropriate nodes). In local memory, Nodes 1-4 of the B-tree would be structured as shown in FIG. 4G once the first process adds the insertion requests to Nodes 2 and 4. The first process 302 determines that Node 3's buffer is overfull (BufferValues>MaxBuffer). Based on this determination, the first process 302 flushes the buffer of Node 3. As discussed previously, the first process 302 may make the overfull determination prior to inserting the latest requests into Node 3's buffer, effectively eliminating the need to "overfill" the buffer before determining that overflow will occur.

To flush Node 3's buffer, in this example, the first process 302 will flush the largest batch which, in this case, is the batch for Node 2. In order to carry out this flushing operation, the first process 302 requests Node 2 from the service program 308. The service program 308 responds by transmitting Node 2 to the first process 302.

Figure 4H:
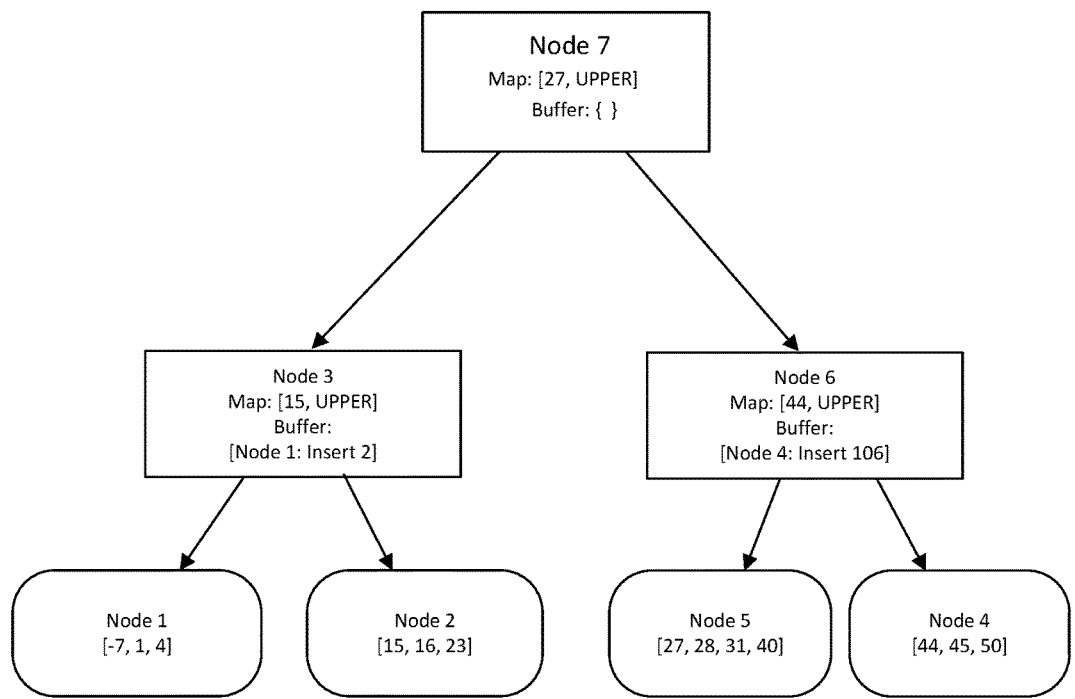

The first process 302 determines that Node 2 cannot accommodate all of the values of the batch that is being flushed (the values 16, 23, and 40) because inserting the values into Node 2 would cause Values to exceed MaxValues. Furthermore, Node 3 already has three children (which is MaxChildren). The first process 302 therefore creates three additional nodes—Node 5, Node 6, and Node 7—and reorganizes the B-tree 310 as shown in FIG. 4H. In doing so, the first process 302 effectively splits Node 2 into Node 2 and Node 5 so that Node 3 would (if permitted) have four children—Node 1, Node 2, Node 5, and Node 4—thereby exceeding the limit specified by MaxChildren. After Node 3 exceeds its allowed number of children (or before, since the first process 302 could, in some embodiments, determine the outcome in advance), the first process 302 splits Node 3 into Node 3 and Node 6 so that Node 3 becomes the parent only to Node 1 and Node 2 and Node 6 becomes the parent of Node 4 and Node 5. In other words, the first process 302: (a) makes Node 4 and Node 5 children of Node 6, (b) makes Node 3 and Node 6 children of Node 7, (c) indicates, in the map of Node 7, that (i) Node 3 is to be assigned all values of less than 27, and (ii) Node 6 is to be assigned all values of 27 or greater, (d) indicates, in the map of Node 3, that (i) Node 1 is to be assigned all values of less than 15, and (ii) Node 2 is to be assigned all values of 15 or greater, and (e) indicates, in the map of Node 6, that (i) Node 5 is to be assigned all values of less than 44, and (ii) Node 4 is to be assigned all values of 44 or greater. The first process 302 removes 27, 28, and 31 from Node 2; inserts 16 and 23 into Node 2; inserts 27, 28, 31, and 40 into Node 5. The first process 302 also removes, from Node 3, the contents of the buffer for Node 4, and adds, to the buffer for Node 6, the contents of the buffer for Node 4. The first process 302 then sends the modified Node 3, the modified Node 2, and the newly-created Node 5, Node 6, and Node 7 to the service program 308 (e.g., by transmitting a "write" request to the service program 308). The service program 308 responds by modifying the B-tree 310 with the modified Node 3, the modified Node 2, the new Node 5, the new Node 6, and the new Node 7 within the media storage device 108. After the service program 308 modifies the B-tree 310, the B-tree 310 is structured as shown in FIG. 4H.

In an embodiment, the techniques described herein result in the computing device 100 carrying out fewer of reads from and writes to the media storage device 108 than existing B-tree maintenance techniques, thereby saving time and bandwidth. Reducing the number of reads and writes also saves money, particularly when the media storage device 108 is controlled by a third party SaaS provider that charges according to the number of transactions (e.g., reads and writes). Table 1 below shows a comparison between the techniques described herein (using the example scenario above) and using a simple B-tree maintenance scheme (which does not use buffering or batching within the tree).

TABLE 1

| Techniques Described Herein | Simple Maintenance Scheme |
|---|---|
| Max size of 4 in buffer. Max size of 4 in values. | Max size of 8 values per node. |
| Initial root: | Initial root: |
| Node 1 | Node 1 |
|   Root: true; leaf: true |   Root: true; leaf: true |
|   Values: [1, 4, 27] |   Values: [1, 4, 27] |
| Requests: INSERT 15 | |
| Read Node 1 | Read Node 1 |
| Modify Node 1 | Modify Node 1 |
|   Root: true; leaf: true |   Root: true; leaf: true |
|   Values: [1, 4, 15, 27] |   Values: [1, 4, 15, 27] |
| Write Node 1 | Write Node 1 |
| 1 node read, 1 node written | 1 node read, 1 node written |
| Requests: INSERT −7, INSERT 45 | |
| Read Node 1 | Read Node 1 |
| Modify Node 1 | Modify Node 1 |
|   Root: false; leaf: true |   Root: false; branch: false; leaf: true |
|   Values: [−7, 1, 4] |   Values: [−7, 1, 4, 15, 27] |
| Create Node 3 | Write Node 1 |
|   Root: true; leaf: false | Read Node 1 |
|   Values: [15, UPPER] | Modify Node 1 |
| Create Node 2 |   Root: false; branch: false; leaf: true |
|   Root: false; leaf: true |   Values: [−7, 1, 4, 15, 27, 45] |
|   Values: [15, 27, 45] | Write Node 1 |
| Write Node 1, Node 2, and Node 3 | |
| 1 node read, 3 nodes written | 2 nodes read, 2 nodes written |
| INSERT 2, INSERT 28, INSERT 50 | |
| Read Node 3 | Read Node 1 |
| Modify Node 3 | Modify Node 1 |
|   Root: true; leaf: false |   Root: false; branch: false; leaf: true |
|   Map: [15, UPPER] |   Values: [−7, 1, 2, 4, 15, 27, 45] |
|   Buffer: {Node 1: insert 2 \| Node 2: insert 28, insert 50} | Write Node 1 |
| Write Node 3 | Read Node 1 |
| | Modify Node 1 |
| |   Root: false; branch: false; leaf: true |
| |   Values: [−7, 1, 2, 4] |
| | Create Node 2 |
| |   Root: false; branch: false; leaf: true |
| |   Values: [15, 27, 28, 45] |
| | Create Node 3 |
| |   Root: true; branch: true; leaf: false |
| |   Map: [15, UPPER] |
| | Write Node 1, Node 2, and Node 3 |
| | Read Node 3 |
| | Read Node 2 |

TABLE 1-continued

| Techniques Described Herein | Simple Maintenance Scheme |
|---|---|
| | Modify Node 2<br>  Root: false; branch: false; leaf: true<br>  Values: [15, 27, 28, 45, 50]<br>Write Node 2 |
| 1 node read, 1 node written | 4 nodes read, 5 nodes written |
| INSERT 31, INSERT 44 ||
| Read Node 3 | Read Node 3 |
| Modify Node 3 | Read Node 2 |
|   Root: true; leaf: false | Modify Node 2 |
|   Map: [15, 44, UPPER] |   Root: false; branch: false; leaf: true |
|   Buffer: {Node 1: insert 2} |   Values: [15, 27, 28, 31, 45, 50] |
| Modify Node 2 | Write Node 2 |
|   Root: false; leaf: true | Read Node 3 |
|   Values: [15, 27, 28, 31] | Read Node 2 |
| Create Node 4 | Modify Node 2 |
|   Root: false; leaf: true |   Root: false; branch: false; leaf: true |
|   Values: [44, 45, 50] |   Values: [15, 27, 28, 31, 44, 45, 50] |
| Write Node 2, Node 3, Node 4 | Write Node 2 |
| 2 nodes read, 3 nodes written | 4 nodes read, 2 nodes written |
| INSERT 16, INSERT 23, INSERT 40, INSERT 106 ||
| Read Node 3 | Read Node 3 |
| Read Node 2 | Read Node 2 |
| Create Node 5 | Modify Node 2 |
|   Root: false; leaf: true |   Root: true; branch: false; leaf: true |
|   Values: [27, 28, 31, 40] |   Values: [15, 16, 27, 28] Create Node 4 |
| Create Node 6 |   Root: false; branch: false; leaf: true |
|   Root: false; leaf: false |   Values: [31, 44, 45, 50] |
|   Map: [44, UPPER] | Modify Node 3 |
|   Buffer: [Node 4: insert 106] |   Root: true; branch: false; leaf: true |
| Modify Node 2 |   Map: [15, 31, UPPER] |
|   Root: false; leaf: true | Write Node 2, Node 3, Node 4 |
|   Values: [15, 16, 23] | Read Node 3 |
| Modify Node 3 | Read Node 2 |
|   Root: true; leaf: false | Modify Node 2 |
|   Map: [15, 44, UPPER] |   Root: false; branch: false; leaf: true |
|   Buffer: [Node 1: insert 2] |   Values: [15, 16, 23, 27, 28] |
| Create Node 7 | Write Node 2 |
|   Root: false; leaf: false | Read Node 3 |
|   Map: [27, UPPER] | Read Node 4 |
|   Buffer: { } | Modify Node 4 |
| Write Node 2, Node 3, |   Root: false; branch: false; leaf: true |
| Node 5, Node 6, Node 7 |   Values: [31, 40, 44, 45, 50] |
| | Write Node 4 |
| | Read Node 3 |
| | Read Node 4 |
| | Modify Node 4 |
| |   Root: false; branch: false; leaf: true |
| |   Values: [31, 40, 44, 45, 50, 106] |
| | Write Node 4 |
| 2 nodes read, 5 nodes written | 8 nodes read, 6 nodes written |
| Total reads: 7 | Total reads: 19 |
| Total writes: 13 | Total writes: 16 |

As can be seen from Table 1, using the techniques described herein for the above-described scenario results in 12 (63%) fewer nodes being read from the media storage device 108 and 3 (19%) fewer nodes being written to the media storage device 108.

Turning to FIGS. 5A-5E, an example of how a computing device maintains a B-tree according to an embodiment will be described in the context of the system shown in FIG. 3. For illustrative purposes, it is assumed that the database program 308 is used by a public library system. In this example, the B-tree 310 includes a root Node 1 and branch nodes 1, 2, 3, 4, 5, and 6. Underneath the various branch nodes are leaf nodes 7-23. The relationships between the various nodes of the B-tree are indicated by the lead lines. For ease of reference, each node will be referred to by its respective label ("Node 1," "Node 2," etc.) shown in FIGS. 5A-5E. The B-tree 310 is shown as being small for the purpose of facilitating the description of various embodiments. It is to be understood, however, that the techniques described herein may be employed on much larger B-trees.

Each node of the B-tree 310 is a data structure that is stored in one or more locations accessible by the computing device 100. Each node of the B-tree 310 includes the following metadata: a root node indicator ("root-node") that indicates whether or not the node is a root node, and a leaf node indicator ("leaf-node") that indicates whether or not the node is a leaf node.

Each leaf node may additionally include content ("node content"). In an embodiment, the node content may include one or more tuples. An example of a tuple is an entity-attribute-value ("EAV") that corresponds to a datum or to data in the database 312 (e.g., corresponds to a "fact" in the database 312). If the node is a branch node, then it also includes the following metadata: a minimum value indicator ("min-val") that indicates the lower limit of values that should be routed to it and a maximum value indicator ("max-val") that indicates the upper limit of values that should be routed to it. Note that "value" in the context of "min-val" and "max-val" refers to the ordering of the node content (e.g., in alphanumerical order, such that [100: . . . ] is less than, for example, [150: . . . ]) and not to the "value" in the EAV sense.

In an embodiment, each branch node also includes a cap-key map, which includes one or more cap-key entries. Each cap-key entry associates a child node (of the branch node) with a maximum value assigned to the child node. The cap-key entries are ordered from the alphanumerically lowest to the alphanumerically highest. The highest cap-key entry is designated and, in this embodiment, has a value of infinity (which is signified by the name "UPPER"). The first process 302 uses the cap-key map to determine the branch down which new data will go.

In an embodiment, the min-val and a max-val of a branch node do not directly indicate what the limits of node content that are to be routed to the branch are, but rather are indirect indicators. In one implementation, for example, a min-key is calculated (e.g., by the computing device 100) as follows: a leaf node has a min-val that represents the smallest value (of node content) the leaf node contains. A branch node knows what the smallest value contained in any insert message within its own buffer is (referred to as MinInsertMessage for the sake of discussion). A branch node can "ask" (via query) its left-most (smallest-most) child what the child's min-val is (referred to as LeftmostMinVal for the sake of discussion). The branch node's min-val is calculated to be the minimum of these two numbers, MinInsertMessage and LeftmostMinVal. This is recursive process. In other words, the min-val for a node is used to determine, in that node's parent, the cap-key for the node's nearest neighbor to the left (if it exists). In that way, the min-val indirectly impacts the limits on values routed to the node. The max-value is updated in an analogous manner to the min-value, but it is not used to influence routing in the same way as does the min-value—hence the "UPPER" key at the top of a map.

In an embodiment, each branch node includes a buffer for holding an update request. The update requests are grouped into batches according to the node (or path to the node) that should receive the instruction (when the buffer is flushed). The buffer may include one or more indicators (e.g., labels or headers) to indicate the node to which each batch is destined. In the example of FIGS. 5A-5E, the maximum buffer size is six. Note that an update request may end up residing in a buffer without group mates (e.g., if it ends up being the only request destined for a particular node or path to a node by the time a buffer is flushed).

To illustrate the notation used in this example, refer to Table 2, which shows a sample of metadata and a node content. The node content has three entries, each in the EAV form. In long form, the entity identified by an entity ID of 100 (the Bozeman Public Library, in this example) has an attribute of ":ownsbook" and a value of 1024; the entity identified by an entity ID of 100 has an attribute of ":ownsbook" and a value of 1025; and the entity identified by entity ID of 100 has an attribute of ":ownsbook" and a value of 1137.

TABLE 2

| Metadata: | :root-node false, |
| --- | --- |
|  | :leaf-node true |
| Node Content: | [100 :ownsBook 1024], |
|  | [100 :ownsBook 1025], |
|  | [100 :ownsBook 1137] |

It is to be understood for the purposes of this example that "entity ID" is not an ID of the node but rather a unique ID of an entity (the Bozeman Public Library) recognized within the database 312. In the example above, 100 is an ID of entity that already exists in the B-tree 310 of ":type/Library." The node content of the above node indicates that the library with the entity ID of 100 owns books with the entity ID of 1024, 1025, and 1137.

Initially (i.e., at some point prior to the detailed example, such as when the database 312 was originally set up), another process (e.g., the second process 304) transmits the requests shown in Tables 3, 4, and 5 to the first process 302. These requests, when carried out by the first process 302 (which stores the results in the media storage device 108), create the appropriate nodes in the B-tree 310. For ease of explanation, the nodes representing the facts that these requests represent are not depicted in FIGS. 5A-5E.

The following requests assert facts regarding the entity types in the database 312:

TABLE 3

| [10 :ident :type/Book] |
| --- |
| [11 :ident :type/Library] |
| [12 :ident :type/Person] |
| [13 :ident :type/Author] |

The following requests assert facts regarding the existence of the Bozeman Public Library ("BPL") (which has an element ID of 100) and the existence of three library books:

TABLE 4

| [100 :ident 11] |
| --- |
| [1024 :ident 10] |
| [1025 :ident 10] |
| [1137 :ident 10] |

The following requests assert facts regarding a relationship between each of the library books and the BPL (specifically that each of these books is owned by the BPL):

TABLE 5

| [100 :ownsBook 1024] |
| --- |
| [100 :ownsBook 1025] |
| [100 :ownsBook 1137] |

To illustrate the notation shown in Tables 3-5, an example of how the facts shown in Table 3 are asserted, in an embodiment, will now be described. When the database is initialized, a schema will be transacted, which establishes a set of valid attribute and value types: [3 3 :ident], [4 3 :attributeType], [7 3 :keyword], [3 4 7]. The first of these establishes an entity 3, which has itself as an attribute, pointing to the value :ident. In other words, the attribute ident has the attribute ident of ident. The second can be read as [4 :ident :attributeType]. It means that the entity 4 has an :ident attribute of :valueType. The third can be read as [7 :ident :keyword]. It means that the entity 7 has an :ident attribute of :valueType. The fourth can be read as [3 :attributeType :keyword]. It means that the entity 3 (:ident) has an :attributeType of :keyword. These are the kinds of relationships that may encoded in the database at its very first initialization step. This allows the user to transact their domain-specific schema on top by, for example, asserting values such as the following:

[10 :ident :type/Book]
[11 :ident :type/Library]
[12 :ident :type/Person]
[13 :ident :type/Author]

These will get encoded, respectively, as, for example:

[10 3 :type/Book]
[11 3 :type/Library]
[12 3 :type/Person]
[13 3 :type/Author]

This now establishes 10, 11, 12, and 13 as new entities with their respective keyword identities. These would be paired with other elements of the schema to tag new entities as books, libraries, persons, or authors.

Put still another way:
Entity 10 has the identity :type/Book
Entity 11 has the identity :type/Library
Entity 12 has the identity :type/Person
Entity 13 has the identity :type/Author.

In an embodiment, these notations have meaning given other portions of the domain-specific schema, such that new entities can be tagged as being one of these types. The keywords become, in a sense, user-friendly handles for numbers, because they are more efficient for a computer to process.

Figure 5A:
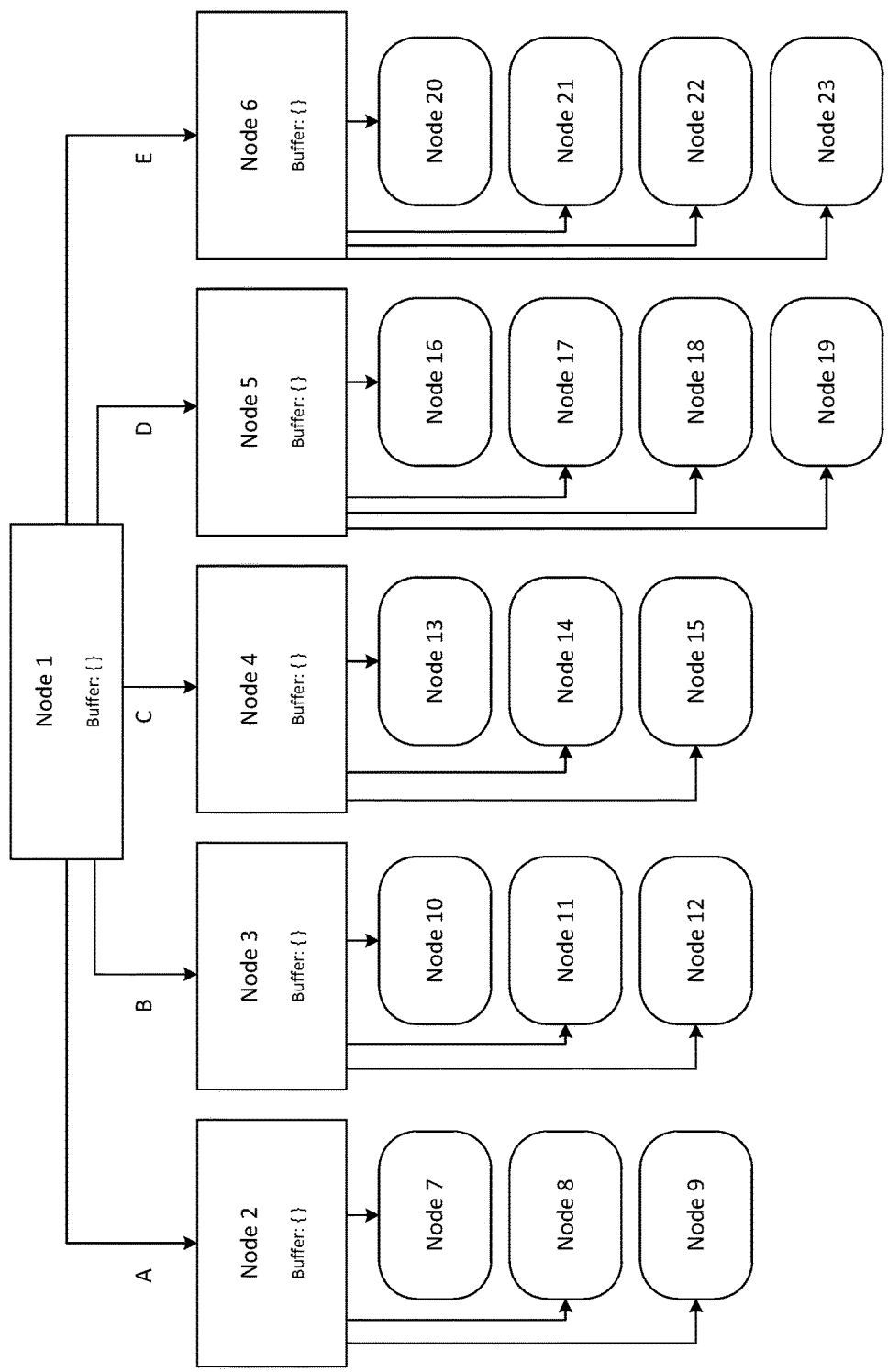
FIGS. 5A-5E illustrate how a B-tree is maintained in the context of an example database system, according to an embodiment.

Turning to FIG. 5A, the B-tree 310 has three layers. In the first layer is Node 1, whose characteristics are shown in Table 6.

TABLE 6

| Node 1 | |
| --- | --- |
| Node ID: | #AF24C |
| Metadata: | :root-node true, |
|  | :leaf-node false, |
|  | :min-val [10 :ident :type/Book], |
|  | :max-val [11002 :wroteBook 1021] |
| Cap-key map: | |
| [100 :ownsBook 1290] | POINTER: id    #8A001, |
|  | :node-size 3, |
|  | :leaf-node false, |
|  | :root-node false, |
|  | :min-val [10 :ident :type/Book], |
|  | :max-val [100 :ownsBook 1137] |
| [569 :type 12] | POINTER: id    #F99A0, |
|  | :node-size 3, |
|  | :leaf-node false, |
|  | :root-node false, |
|  | :min-val [100 :ownsBook 1290], |
|  | :max-val [569 :name "Miguel Torres"] |
| [1023 :name "The Fellowship of the Ring"] | POINTER: id #FE2A2, |
|  | :node-size 3, |
|  | :leaf-node false, |
|  | :root-node false, |

TABLE 6-continued

Node 1

| | |
|---|---|
| | :min-val [569 :type 12], |
| | :max-val [1023 :isOverdue? 0] |
| [10104 :type 13] | POINTER: id   #FC5BD, |
| | :node-size 4, |
| | :leaf-node false, |
| | :root-node false, |
| | :min-val [1023 :name "The Fellowship of the Ring"], |
| | :max-val [10104 :name "J.R.R. Tolkien"] |
| UPPER | POINTER: id   #41D4D |
| | :node-size 4, |
| | :leaf-node false, |
| | :root-node false, |
| | :min-val [10104 :type 13], |
| | :max-val [11002 :wroteBook 1021] |

Buffer: { }

Layer 2:

In the second layer are Nodes 2, 3, 4, 5, and 6, whose characteristics, respectively, are as follows:

TABLE 7

Node 2

Node ID:   #8A001
Metadata:    :root-node false,
             :leaf-node false,
             :min-val [10 :ident :type/Book],
             :max-val [100 :ownsBook 1137]
Cap-key map:

| | |
|---|---|
| [100 :name "Bozeman Public"]   POINTER: id   #49D2D, | |
| | :node-size 4, |
| | :leaf-node true, |
| | :root-node false, |
| | :min-val [10 :ident :type/Book], |
| | :max-val [13 :ident :type/Author] |
| [100 :ownsBook 1024] | POINTER: id   #66875, |
| | :node-size 4, |
| | :leaf-node true, |
| | :root-node false, |
| | :min-val [100 :name "Bozeman Public"], |
| | :max-val [100 :ownsBook 1023] |
| UPPER | POINTER: id   #7DE3D, |
| | :node-size 3, |
| | :leaf-node true, |
| | :root-node false, |
| | :min-val [100 :ownsBook 1024], |
| | :max-val [100 :ownsBook 1137] |

Buffer: { }

TABLE 8

Node 3

Node ID: #F99A0
Metadata:    :root-node false,
             :leaf-node false,
             :min-val [100 :ownsBook 1290],
             :max-val [569 :name "Miguel Torres"]
Cap-key map:

| | |
|---|---|
| [560 :name "Maria Ashby"]   POINTER: id   #30B2E, | |
| | :node-size 4, |
| | :leaf-node true, |
| | :root-node false, |
| | :min-val [100 :ownsBook 1290], |
| | :max-val [560 :hasBook 1024] |
| [567 :type 12] | POINTER: id   #7FC56, |
| | :node-size 4, |
| | :leaf-node true, |
| | :root-node false, |
| | :min-val [560 :name "Maria Ashby"], |
| | :max-val [567 :name "Frank Klein"] |

TABLE 8-continued

Node 3

| | |
|---|---|
| UPPER | POINTER: id   #2A5D2, |
| | :node-size 3, |
| | :leaf-node true, |
| | :root-node false, |
| | :min-val [567 :type 12], |
| | :max-val [569 :name "Miguel Torres"] |

Buffer: { }

TABLE 9

Node 4

Node ID: #FE2A2
Metadata:    :root-node false,
             :leaf-node false,
             :min-val [569 :type 12],
             :max-val [1023 :isOverdue? 0]
Cap-key map:

| | |
|---|---|
| [573 :type 12] | POINTER: id   #26813, |
| | :node-size 3, |
| | :leaf-node true, |
| | :root-node false, |
| | :min-val [569 :type 12], |
| | :max-val [573 :name "Margaret Haynes"] |
| [1021 :isOverdue? 0] | POINTER: id   #AEE3F, |
| | :node-size 4, |
| | :leaf-node true, |
| | :root-node false, |
| | :min-val [573 :type 12], |
| | :max-val [1020 :type 10] |
| UPPER | POINTER: id   #E2DFE, |
| | :node-size 4, |
| | :leaf-node true, |
| | :root-node false, |
| | :min-val [1021 :isOverdue? 0], |
| | :max-val [1023 :isOverdue? 0] |

Buffer: { }

TABLE 10

Node 5

Node ID: #FC5BD
Metadata:    :root-node false,
             :leaf-node false,
             :min-val [1023 :name "The Fellowship of the Ring"],
             :max-val [10104 :name "J.R.R. Tolkien"]
Cap-key map:

| | |
|---|---|
| [1024 :name "The Two Towers"] | POINTER: id   #AA64A, |
| | :node-size 3, |
| | :leaf-node true, |
| | :root-node false, |
| | :min-val [1023 :name "The Fellowship of the Ring"], |
| | :max-val [1024 :isOverdue? 0] |
| [1137 :isOverdue? 1] POINTER :id   #C8009, | |
| | :node-size 5, |
| | :leaf-node true, |
| | :root-node false, |
| | :min-val [1024 :name "The Two Towers"], |
| | :max-val [1025 :type 10] |
| [1290 :name "De Pudicitia"] | POINTER :id   #003B2, |
| | :node-size 4, |
| | :leaf-node true, |
| | :root-node false, |
| | :min-val [1137 :isOverdue? 1], |
| | :max-val [1290 :isOverdue? 0] |
| UPPER     POINTER :id   #E1EAC, | |
| | :node-size 3, |
| | :leaf-node true, |
| | :root-node false, |

TABLE 10-continued

Node 5

|  |  |
|---|---|
|  | :min-val [1290 :name "De Pudicitia"],<br>:max-val [10104 :name "J.R.R. Tolkien"] |
| Buffer: { } |  |

TABLE 11

Node 6

Node ID: #41D4D
Metadata:   :root-node false,
           :leaf-node false,
           :min-val [10104 :type 13],
           :max-val [11002 :wroteBook 1021]
Cap-key map:
[10104 :wroteBook 1025] POINTER: id   #44DF2,
                                  :node-size 3,
                                    :leaf-node true,
                                    :root-node false,
                                    :min-val [10104 :type 13],
                                    :max-val [10104 :wroteBook 1024]
   [10188 :type 13]          POINTER: id   #3CF70,
                                    :node-size 3,
                                    :leaf-node true,
                                    :root-node false,
                                    :min-val [10104 :wroteBook 1025],
                                    :max-val [10188 :name "Quintus Tertullianus"]
   [11002 :type 13]          POINTER: id   #E4DD0,
                                    :node-size 3,
                                    :leaf-node true,
                                    :root-node false,
                                    :min-val [10188 :type 13],
                                    :max-val [11002 :name "Albert Camus"]
   UPPER                  POINTER: id   #C5FEA,
                                    :node-size 3,
                                    :leaf-node true,
                                    :root-node false,
                                    :min-val [11002 :type 13],
                                    :max-val [11002 :wroteBook 1021]
Buffer: { }

Layer 3:

In the third layer are nodes 7, 8, 9, 10, 11, 12, 13, 14, 15, 16, 17, 18, 19, 20, 21, 22, and 23 whose characteristics, respectively, are shown in Tables 12-28:

TABLE 12

Node 7

| | |
|---|---|
| Node ID: #49D2D | |
| Metadata: | :root-node false,<br>:leaf-node true |
| Node Content: | [10 :ident :type/Book],<br>[11 :ident :type/Library],<br>[12 :ident :type/Person],<br>[13 :ident :type/Author] |

TABLE 13

Node 8

| | |
|---|---|
| Node ID: #66875 | |
| Metadata: | :root-node false,<br>:leaf-node true |
| Node Content: | [100 :name "Bozeman Public"],<br>[100 :ownsBook 1020],<br>[100 :ownsBook 1021],<br>[100 :ownsBook 1023] |

TABLE 14

Node 9

| | |
|---|---|
| Node ID: #7DE3D | |
| Metadata: | :root-node false,<br>:leaf-node true |
| Node Content: | [100 :ownsBook 1024],<br>[100 :ownsBook 1025],<br>[100 :ownsBook 1137] |

TABLE 15

Node 10

| | |
|---|---|
| Node ID: #30B2E | |
| Metadata: | root-node false,<br>:leaf-node true |
| Node Content: | [100 :ownsBook 1290],<br>[100 :type 11],<br>[560 :hasBook 1021],<br>[560 :hasBook 1024] |

TABLE 16

Node 11

| | |
|---|---|
| Node ID: #7FC56 | |
| Metadata: | root-node false,<br>:leaf-node true |
| Node Content: | [560 :name "Maria Ashby"],<br>[560 :type 12],<br>[567 :hasBook 1023],<br>[567 :name "Frank Klein"] |

TABLE 17

Node 12

| | |
|---|---|
| Node ID: #2A5D2 | |
| Metadata: | :root-node false,<br>:leaf-node true |
| Node Content: | [567 :type 12],<br>[569 :hasBook 1290],<br>[569 :name "Miguel Torres"] |

TABLE 18

Node 13

| | |
|---|---|
| Node ID: #26813 | |
| Metadata: | :root-node false,<br>:leaf-node true |
| Node Content: | [569 :type 12],<br>[573 :hasBook 1137],<br>[573 :name "Margaret Haynes"] |

TABLE 19

Node 14

| | |
|---|---|
| Node ID: #AEE3F | |
| Metadata: | :root-node false,<br>:leaf-node true |
| Node Content: | [573 :type 12],<br>[1020 :isOverdue? 0],<br>[1020 :name "The Stranger"],<br>[1020 :type 10] |

TABLE 20

Node 15

| | |
|---|---|
| Node ID: #E2DFE | |
| Metadata: | :root-node false, |
| | :leaf-node true |
| Node Content: | [1021 :isOverdue? 0], |
| | [1021 :name "The Stranger"], |
| | [1021 :type 10], |
| | [1021 :isOverdue? 0] |

TABLE 21

Node 16

| | |
|---|---|
| Node ID: #AA64A | |
| Metadata: | :root-node false, |
| | :leaf-node true |
| Node Content: | [1023 :name "The Fellowship of the Ring"], |
| | [1023 :type 10], |
| | [1023 :isOverdue? 1] |

TABLE 22

Node 17

| | |
|---|---|
| Node ID: #C8009 | |
| Metadata: | :root-node false, |
| | :leaf-node true |
| Node Content: | [1024 :name "The Fellowship of the Ring"], |
| | [1024 :type 10], |
| | [1025 :isOverdue? 0], |
| | [1025 :name "The Return of the King"], |
| | [1025 :type 10] |

TABLE 23

Node 18

| | |
|---|---|
| Node ID: #003B2 | |
| Metadata: | root-node false, |
| | :leaf-node true |
| Node Content: | [1137 :isOverdue? 1], |
| | [1137 :name "The Hobbit"], |
| | [1137 :type 10], |
| | [1290 :isOverdue? 0] |

TABLE 24

Node 19

| | |
|---|---|
| Node ID: #E1EAC | |
| Metadata: | :root-node false, |
| | :leaf-node true |
| Node Content: | [1290 :name "De Pudicitia"], |
| | [1290 :type 10], |
| | [10104 :name "J.R.R. Tolkien"] |

TABLE 25

Node 20

| | |
|---|---|
| Node ID: #44DF2 | |
| Metadata: | :root-node false, |
| | :leaf-node true |
| Node Content: | [10104 :type 13], |
| | [10104 :wroteBook 1023], |
| | [10104 :wroteBook 1024] |

TABLE 26

Node 21

| | |
|---|---|
| Node ID: #3CF70 | |
| Metadata: | :root-node false, |
| | :leaf-node true |
| Node Content: | [10104 :wroteBook 1025, |
| | [10104 :wroteBook 1137], |
| | [10188 :name "Quintus Tertullianus"] |

TABLE 27

Node 22

| | |
|---|---|
| Node ID: #E4DD0 | |
| Metadata: | :root-node false, |
| | :leaf-node true |
| Node Content: | [10188 :type 13], |
| | [10188 :wroteBook 1290], |
| | [10188 :name "Albert Camus"] |

TABLE 28

Node 23

| | |
|---|---|
| Node ID: #C5FEA | |
| Metadata: | :root-node false, |
| | :leaf-node true |
| Node Content: | [11002 :type 13], |
| | [11002 :wroteBook 1020], |
| | [11002 :wroteBook 1021] |

The following example will be described in the context of a series of events occurring with respect to the BPL, with appropriate reference to the Figures and the Tables.

First Set of Events

The first set of events are as follows: (1) Samuel Orser walks into the BPL, gets a new card, and (2) puts a hold on the book "The Fellowship of the Ring." The second process 304 generates new facts based on these events. For each of these new facts, the second process 304 transmits requests to the first process 302 to update the B-tree 310 accordingly. In this example, assume that the new facts are those shown below in Table 29. To simplify the explanation, each request will be given the shorthand label shown in Table 29. Additionally, the meaning of each request is also shown in Table 29.

TABLE 29

| Label | Request | Meaning |
|---|---|---|
| Request 1 | [574 :type 12] | There is an entity 574 of type 12 (a person) |
| Request 2 | [574 :name "Samuel Orser"] | The name of the entity 574 is "Samuel Orser." |
| Request 3 | [574 :hasHold 1023] | Entity 574 has a hold on entity 1023 (which is the book "Fellowship of the Ring" |

Figure 5B:
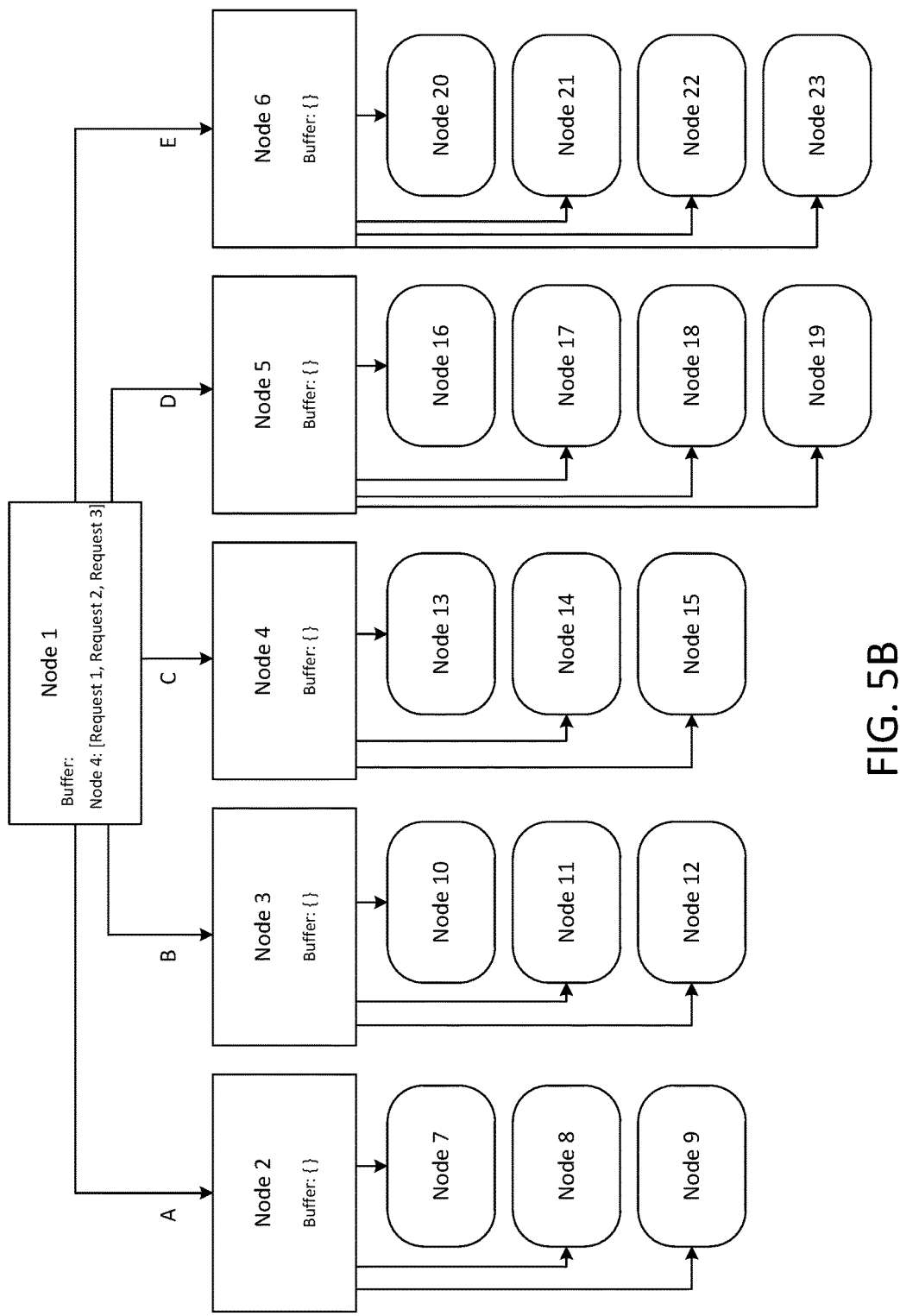

The first process 302 inserts the three messages into the (previously empty) buffer of Node 1, keyed by the same cap-key (#AC590) as the child to which these messages are to be assigned. In this case, all three requests fall within the range assigned to Node 4, and are thus inserted into Node 1's buffer associated with Node 4. The changes to Node 1 are shown in Table 30 with underlined text, and the state of the B-tree 310 after the first process 302 writes Node 1 back to the service program 308 and after the service program 308 updates the B-tree 310 in the media storage device 108 is shown in FIG. 5B.

TABLE 30

Node 1

Node ID: AF24C
Metadata: :root-node true,
:leaf-node false,
:min-val [10 :ident :type/Book],
:max-val [11002 :wroteBook 1021]
Cap-key map:
   [100 :ownsBook 1290]  POINTER: id  #8A001,
                              :node-size 3,
                              :leaf-node false,
                              :root-node false,
                              :min-val [10 :ident :type/Book],
                              :max-val [100 :ownsBook 1137]
   [569 :type 12]        POINTER: id  #F99A0,
                              :node-size 3,
                              :leaf-node false,
                              :root-node false,
                              :min-val [100 :ownsBook 1290],
                              :max-val [569 :name "Miguel Torres"]
   [1023 :name "The Fellowship of the Ring"] POINTER: id #AC590,
                              :node-size 3,
                              :leaf-node false,
                              :root-node false,
                              :min-val [569 :type 12],
                              :max-val [1023 :isOverdue? 1]
   [10104 :type 13]     POINTER: id  #FC5BD,
                              :node-size 4,
                              :leaf-node false,
                              :root-node false,
                              :min-val [1023 :name "The Fellowship of the Ring"],
                              :max-val [10104 :name "J.R.R. Tolkien"]
   UPPER            POINTER: id  #41D4D
                              :node-size 4,
                              :leaf-node false,
                              :root-node false,
                              :min-val [10104 :type 13],
                              :max-val [11002 :wroteBook 1021]
Buffer:
   [1023 :name "The Fellowship of the Ring"]
       [:message/insert 574 :type 12]
       [:message/insert 574 :name "Samuel Orser"]
       [:message/insert 574 :hasHold 1023]

Second Set of Events

The second set of events includes the following: Maria Ashby returns "The Two Towers." The second process 304 generates new facts based on these events. For each of these new facts, the second process 304 transmits the requests shown in Table 31 to the first process 302 to update the B-tree 310 accordingly. The fact that the book was overdue is reflected in these requests.

Put another way, before this set of events, the database stored the fact that Maria Ashby (entity 560) was in possession (:hasBook) of "The Two Towers" (entity 1024). When Maria Ashby returns the book, this is no longer true, so Request 4 is inserted in order to delete that previous assertion. The system in this example presupposes that if no entity has a book, then the book is in the possession of the owner. Requests 5 and 6 show an alternate and more explicit representation for facts (such as in an EAV system), where the database always stores for a given book exactly one statement concerning its being overdue. Before Maria Ashby returned the book, it was overdue (the database contained [1024 :isOverdue? 1]). After this set of events, this statement is no longer true, so the system deletes the statement that it is overdue, and inserts an explicit statement saying it is not overdue.

TABLE 31

| Label | Request | Meaning |
|---|---|---|
| Request 4 | [:message/delete 560 :hasBook 1024] | Entity 560 is no longer in possession of entity 1024 |
| Request 5 | [:message/insert 1024 :isOverdue? 0] | It is now true that entity 1024 has an overdue status of "false." |
| Request 6 | [:message/delete 1024 :isOverdue? 1] | It is no longer true that entity 1024 has an overdue status of "true." |

Figure 5C:
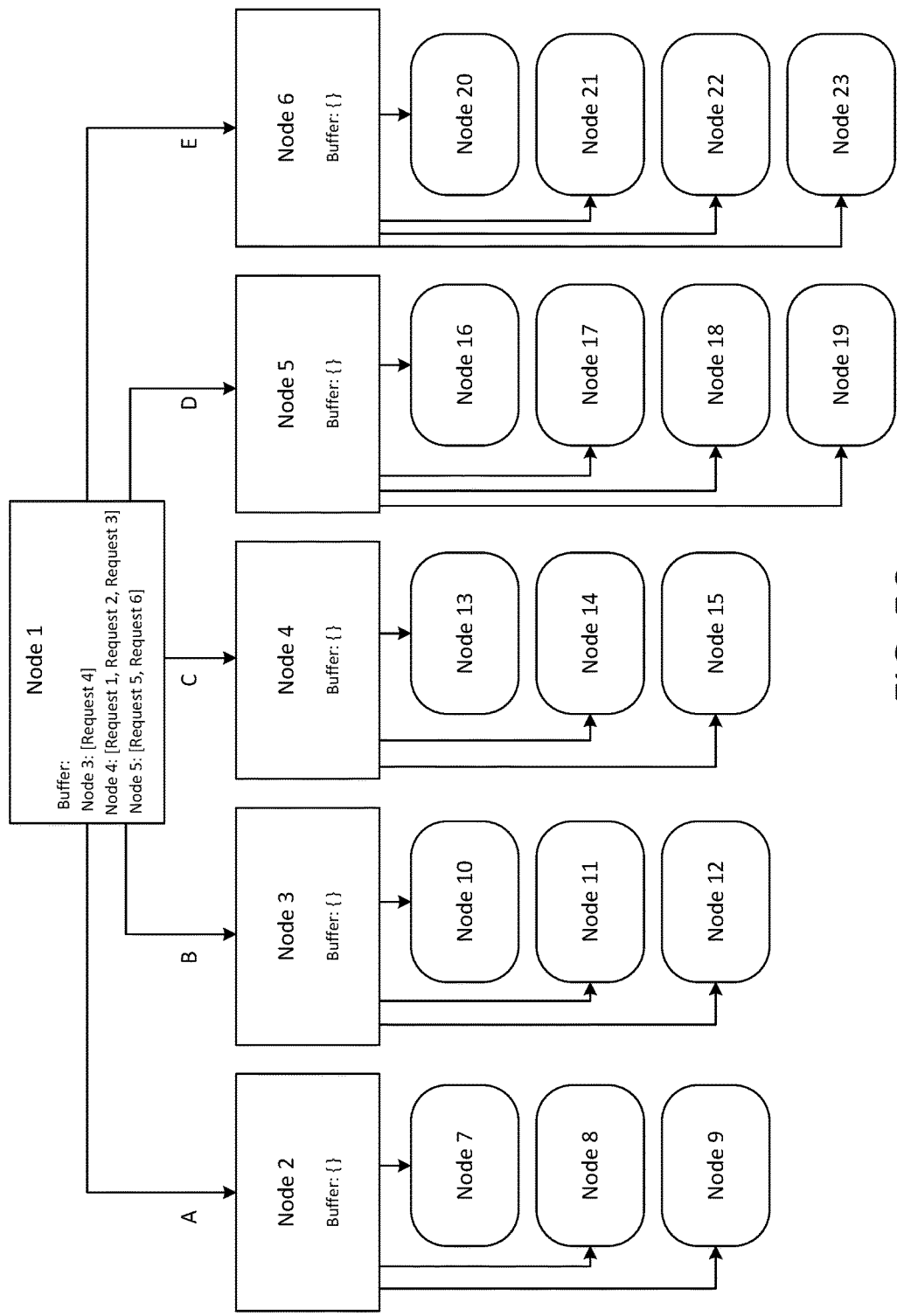

The first process 302 updates the buffer of Node 1 by inserting Request 4 into the buffer associated with Node 3 and inserting Request 5 and Request 6 into the buffer in association with Node 5, as shown in underlined text in Table 32. The state of the B-tree 310 after this update is shown in FIG. 5C.

TABLE 32

Node 1

Node ID: AF24C
Metadata: :root-node true,
:leaf-node false,
:min-val [10 :ident :type/Book],
:max-val [11002 :wroteBook 1021]
   [100 :ownsBook 1290]  POINTER: id  #8A001,
                              :node-size 3,
                              :leaf-node false,
                              :root-node false,
                              :min-val [10 :ident :type/Book],
                              :max-val [100 :ownsBook 1137]
   [569 :type 12]        POINTER: id  #F99A0,
                              :node-size 3,
                              :leaf-node false,
                              :root-node false,
                              :min-val [100 :ownsBook 1290],
                              :max-val [569 :name "Miguel Torres"]
   [1023 :name "The Fellowship of the Ring"] POINTER: id #AC590,
                              :node-size 3,
                              :leaf-node false,
                              :root-node false,
                              :min-val [569 :type 12],
                              :max-val [1023 IsOverdue? 1]
   [10104 :type 13]     POINTER: id  #FC5BD,
                              :node-size 4,
                              :leaf-node false,
                              :root-node false,
                              :min-val [1023 :name "The Fellowship of the Ring"],
                              :max-val [10104 :name "J.R.R. Tolkien"]
   UPPER            POINTER: id  #41D4D
                              :node-size 4,
                              :leaf-node false,
                              :root-node false,
                              :min-val [10104 :type 13],
                              :max-val [11002 :wroteBook 1021]
Buffer:
   [569 :type 12]
       [:message/delete 560 :hasBook 1024]
   [1023 :name "The Fellowship of the Ring"]
       [:message/insert 574 :type 12]
       [:message/insert 574 :name "Samuel Orser"]
       [:message/insert 574 :hasHold 1023]
   [10104 :type 13]
       [:message/insert 1024 :isOverdue? 0]
       [:message/delete 1024 :isOverdue? 1]]

Third Set of Events

The third set of events includes the following: Frank Klein's book becomes overdue. The second process 304 sends update requests to the first process 302 to that effect to the first process 302, as shown in Table 33.

TABLE 33

| Label | Request | Meaning |
| --- | --- | --- |
| Request 7 | [:message/insert 560 :isOverdue? 1] | It is now true that entity 560 has an overdue status of "true." |
| Request 8 | [:message/delete 1023 :isOverdue? 0] | It is no longer true that entity 560 has an overdue status of "false." |

Figure 5D:
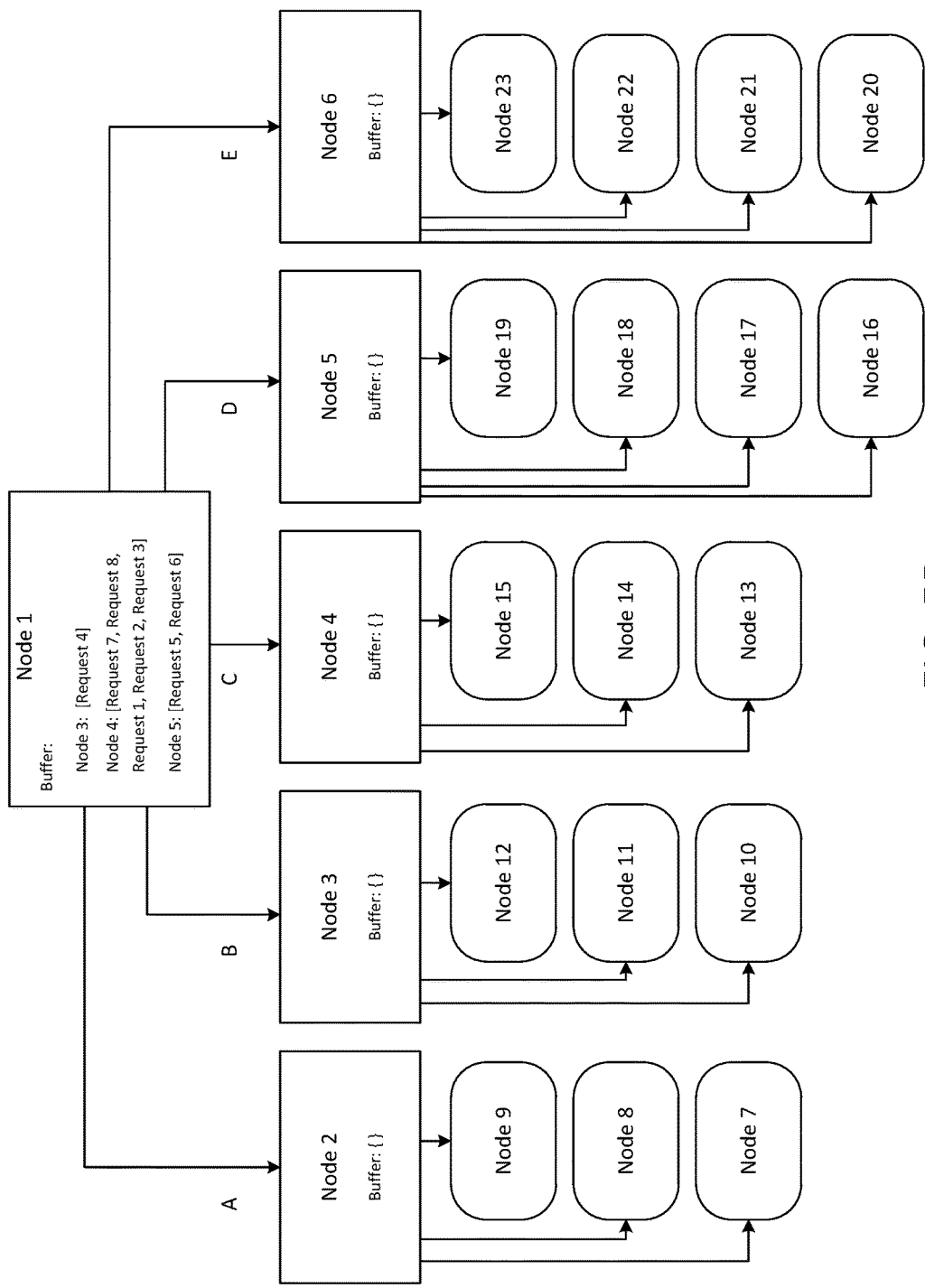
Figure 5E:
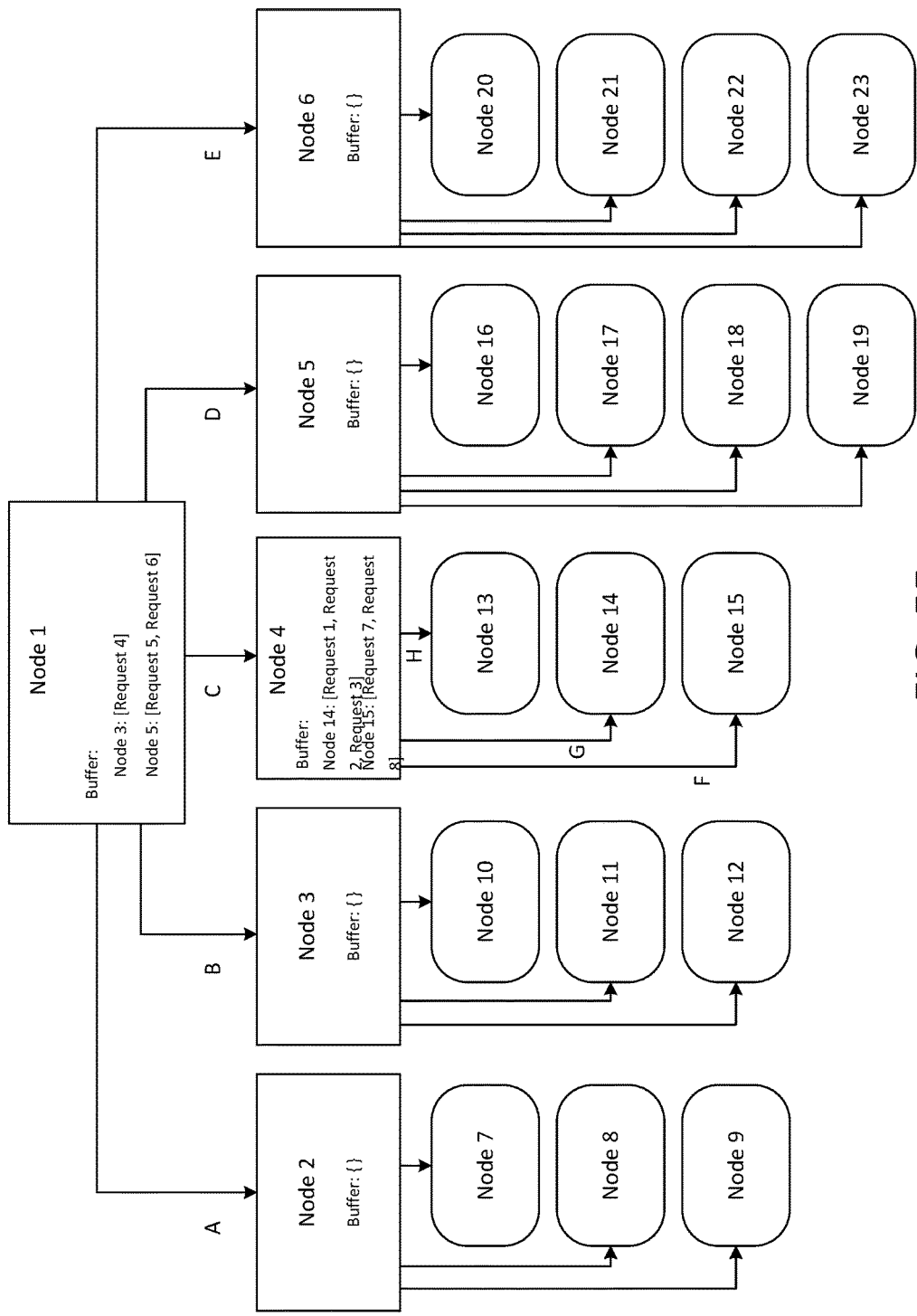

The first process 302 inserts the requests in a portion of Node 1's buffer associated with Node 3 in such a manner as to ensure the requests do not get out of order as they propagate down the B-tree 310. For example, if the requests are to be processed from rear of the buffer associated with Node 3, the first process 302 inserts the requests at the front of Node 3's portion of the buffer. The changes in Node 1 are shown in underlined text in Table 34. The state of Nodes 1-23 in local memory after this update is shown in FIG. 5D.

TABLE 34

Node 1

```
Node ID: AF24C
Metadata:   :root-node true,
            :leaf-node false,
            :min-val [10 :ident :type/Book],
            :max-val [11002 :wroteBook 1021]
    [100 :ownsBook 1290]  POINTER: id  #8A001,
                          :node-size 3,
                          :leaf-node false,
                          :root-node false,
                          :min-val [10 :ident :type/Book],
                          :max-val [100 :ownsBook 1137]
    [569 :type 12]        POINTER: id  #F99A0,
                          :node-size 3,
                          :leaf-node false,
                          :root-node false,
                          :min-val [100 :ownsBook 1290],
                          :max-val [569 :name "Miguel Torres"]
    [1023 :name "The Fellowship of the Ring"] POINTER: id #AC590,
                          :node-size 3,
                          :leaf-node false,
                          :root-node false,
                          :min-val [569 :type 12],
                          :max-val [1023 :isOverdue? 1]
    [10104 :type 13]      POINTER: id  #FC5BD,
                          :node-size 4,
                          :leaf-node false,
                          :root-node false,
                          :min-val [1023 :name "The Fellowship of the Ring"],
                          :max-val [10104 :name "J.R.R. Tolkien"]
    UPPER                 POINTER: id  #41D4D
                          :node-size 4,
                          :leaf-node false,
                          :root-node false,
                          :min-val [10104 :type 13],
                          :max-val [11002 :wroteBook 1021]
Buffer:
    [569 :type 12]
            [:message/delete 560 :hasBook 1024]
    [1023 :name "The Fellowship of the Ring"]
            [:message/insert 560 :isOverdue? 1]
            [:message/delete 1023 :isOverdue? 0]
            [:message/insert 574 :type 12]
            [:message/insert 574 :name "Samuel Orser"]
            [:message/insert 574 :hasHold 1023]
    [10104 :type 13]
            [:message/insert 1024 :isOverdue? 0]
            [:message/delete 1024 :isOverdue? 1]
```

But now Node 1's buffer contains eight requests, so the first process 302 needs to flush it. The first process 302 flushes all of the requests that fall in the range handled by Node 4 (i.e., all requests less than or equal to [1023 :name "The Fellowship of the Ring"] but not less than or equal to [569 :type 12]), which maps to the pointer # AC590. Accordingly, the first process 302 updates two nodes: Node 4, to which the requests were flushed, and Node 1, whose buffer was flushed. The updates to Node 4 are shown in Table 35 and the updates to Node 1 are shown in Table 36.

TABLE 35

Node 4

```
Node ID: #AC590
Metadata:     :root-node false,
              :leaf-node false,
              :min-val [569 :type 12],
              :max-val [1023 :isOverdue? 1]
Cap-key map:
    [573 :type 12]         POINTER:  id #26813,
                           :node-size 3,
                           :leaf-node true,
                           :root-node false,
                           :min-val    [569 :type 12],
                           :max-val    [573 :name "Margaret Haynes"]
    [1021 :isOverdue? 0]   POINTER:  id #AEE3F,
                           :node-size 4,
                           :leaf-node true,
                           :root-node false,
                           :min-val [573 :type 12],
                           :max-val [1020 :type 10]
    UPPER                  POINTER:  id #E2DFE,
                           :node-size 4,
                           :leaf-node true,
                           :root-node false,
                           :min-val [1021 :isOverdue? 0],
                           :max-val [1023 :isOverdue? 0]
Buffer:
    [1021 :isOverdue? 0]
            [:message/insert 574 :type 12]
            [:message/insert 574 :name "Samuel Orser"]
            [:message/insert 574 :hasHold 1023]
    UPPER
            [:message/insert 560 :isOverdue? 1]
            [:message/delete 1023 :isOverdue? 0]
```

TABLE 36

Node 1

```
Node ID: #AF24C
Metadata:   :root-node true,
            :leaf-node false,
            :min-val [10 :ident :type/Book],
            :max-val [11002 :wroteBook 1021] }
Cap-key map:
    [100 :ownsBook 1290]  POINTER:  id #8A001,
                          :node-size 3,
                          :leaf-node false,
                          :root-node false,
                          :min-val [10 :ident :type/Book],
                          :max-val [100 :ownsBook 1137]
    [569 :type 12]        POINTER:   id #F99A0,
                          :node-size 3,
                          :leaf-node false,
                          :root-node false,
                          :min-val [100 :ownsBook 1290],
                          :max-val [569 :name "Miguel Torres"]
    [1023 :name "The Fellowship of the Ring"]   POINTER:
    id #AC590
                          :node-size 3,
                          :leaf-node false,
                          :root-node false,
                          :min-val [569 :type 12],
                          :max-val [1023: isOverdue? 1]
    [10104 :type 13]      POINTER: id #FC5BD,
                          :node-size 4,
                          :leaf-node false,
                          :root-node false,
```

TABLE 36-continued

| | Node 1 |
|---|---|
| | :min-val [1023 :name "The Fellowship of the Ring"], :max-val [10104 :name "J.R.R. Tolkien"] |
| UPPER | POINTER: id #41D4D :node-size 4, :leaf-node false, :root-node false, :min-val [10104 :type 13], :max-val [11002 :wroteBook 1021] |
| Buffer: | |
| [569 :type 12] | |
| [:message/delete 560 :hasBook 1024] | |
| [10104 :type 13] | |
| [message/insert 1024 :isOverdue? 0] | |
| [message/delete 1024 :isOverdue? 1] | |

According to an embodiment, the first process 302 inserts new requests into the buffer of the appropriate node within the local memory of the first computing device 100. It then determines whether the buffer will overflow as a result of the insertions. If so, the first process 302 carries out the flushing process within the local memory so that only the conclusions get sent back to the media storage device 108 (and persisted in the database 312).

In the preceding examples, the messages stored in and propagated down the B-tree 310 have been "insert" and delete" messages. However, other types of messages are possible. According to an embodiment, multiple delete messages may be consolidated into a single delete message. For example, if it was appropriate to delete all of the values of Node 5 and its leaf nodes (FIG. 5D), the first process 302 could issue the appropriate command to node 6 and, once received, the entity handling the deletion would not need the "per node" command but would simply delete the nodes.

In an embodiment, the first process 302 distributes requests in a node's buffer keyed in the same manner as the cap-key map for the node. Furthermore, the first process may modify the max-val metadatum if a request inserting a greater value than the max-val is being inserted into the buffer. The same is true of min-value.

According to an embodiment, the nodes of a B-tree are maintained in the media storage device as immutable elements. That is, whenever a node of the B-tree needs to be updated (e.g., in response to an update request), the computing device 100 creates a copy of the node as a separate, distinct element, updates the copy of the node, and changes the appropriate pointers of the B-tree so as to reference the updated copy. In this way, the knowledge of the former state of the node (and, therefore, the former state of the B-tree) is maintained.

Figure 6A:
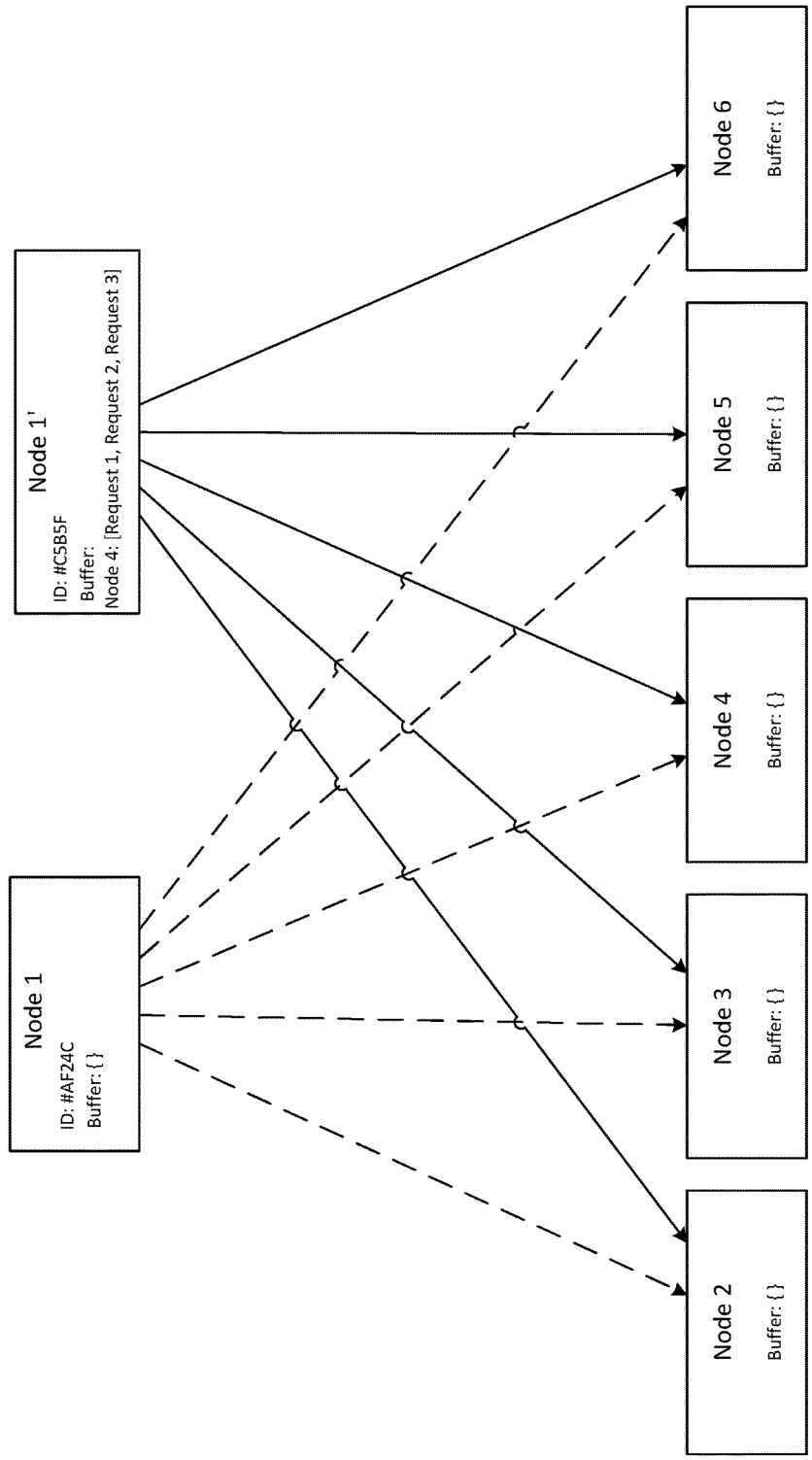
FIGS. 6A-6C illustrate a B-tree that is maintained in the context of the example given in FIGS. 5A-5E, but with the nodes being stored as immutable entities, according to an embodiment.
Figure 6B:
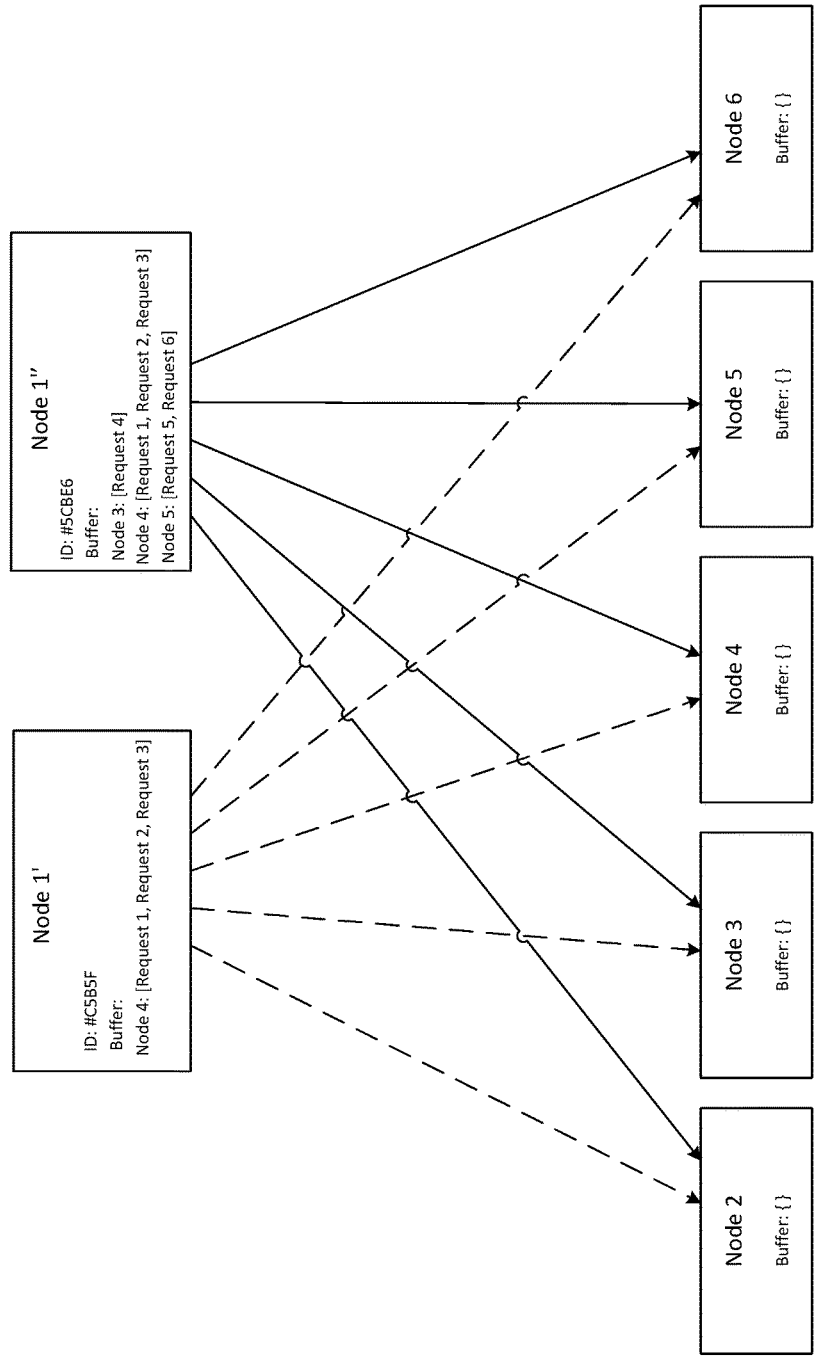
Figure 6C:
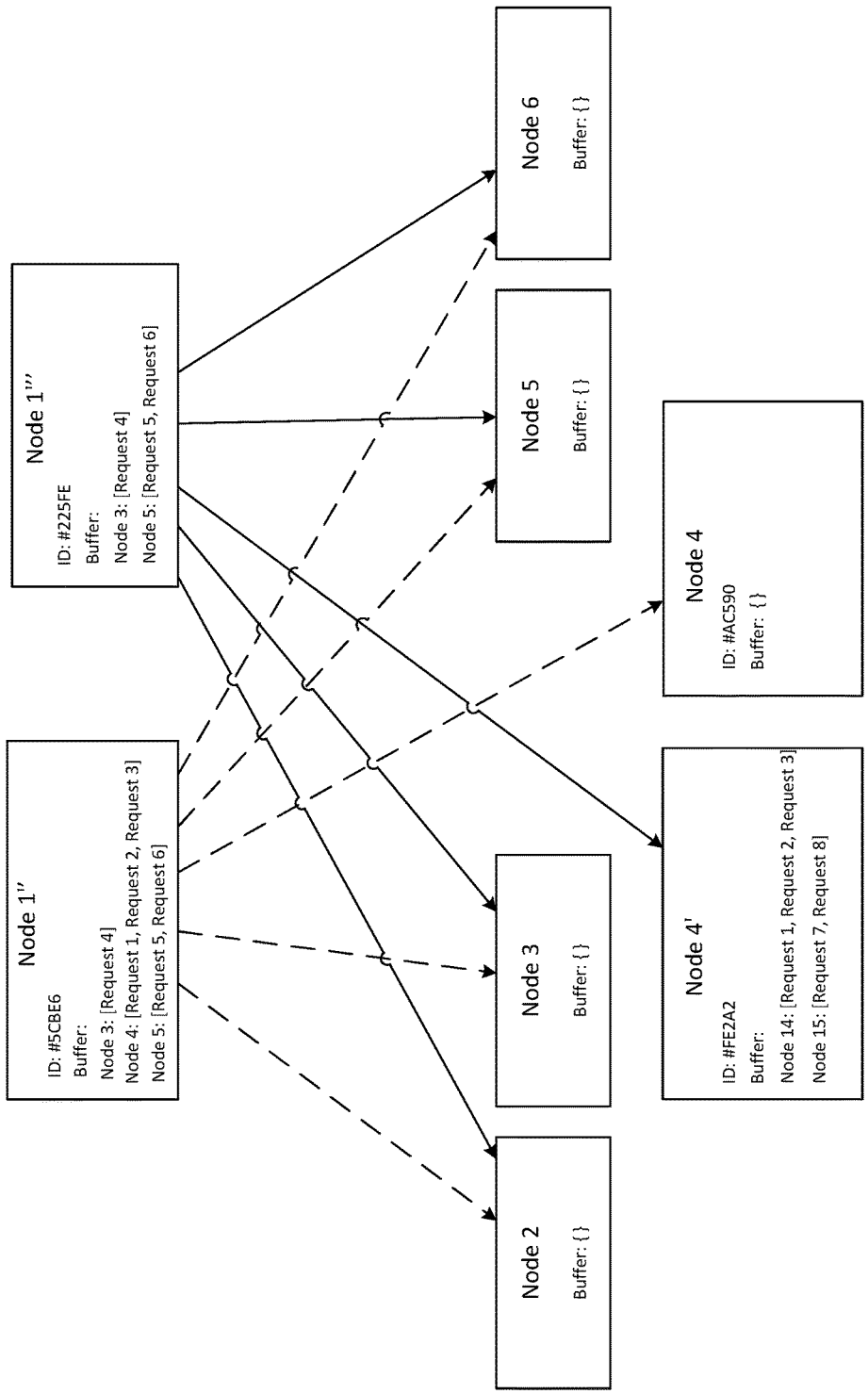

For example, after the first set of events discussed above, the first process 302 may create a copy of Node 1, shown as Node 1' in FIG. 6A, declare it to be the root node, and make it point to the original children—Nodes 1-6. Node 1' will have the same content shown in Table 30, except that its element ID will be different (# C5B5F in this example). After the second set of events discussed above, the first process 302 may create a copy of Node 1', shown as Node 1" in FIG. 6B, declare it to be the root node, and make it point to the original children—Nodes 1-6. Node 1" will have the same content shown in Table 32, except that its element ID will be different (#5CBE6 in this example). After the third set of events, the first process 302 creates a copy of Node 1", shown in FIG. 6C as Node 1''', and creates a copy of Node 4, shown in FIG. 6C as Node 4'. The content of Node 4' will be the same as that of Table 35, except that its element ID will be different (# FE2A2 in this example). The content of Node 1''' will be the same as that of Table 36, except that the element ID will be different (#225FE in this example) and the third pointer in the cap-key map will be different in that it will refer to the element ID of Node 4' (# FE2A2 instead of # AC590 in this example).

In an embodiment, one or both the first process 302 and the service program 308 keeps track of each version of each node of the B-tree 310 by transaction ID. Thus, for example, the transaction ID for Node 1''' would be higher than that of Node 1", which would be higher than Node 1', which would be higher than Node 1. Furthermore, in order to retrieve the B-tree 310 or any version of the B-tree 310, one or both the first process 302 and service program 308 may retrieve all or less of the required nodes according to both their element IDs and the appropriate transaction ID (depending on how far back in "time" (as measured by the incrementing of the transaction IDs) the required version is).

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

What is claimed is:

1. A method, carried out by processor hardware, of modifying a B-tree, wherein the B-tree includes a first node, a second node, and a third node, wherein the first node has a buffer that includes a portion associated with the second node and a portion associated with the third node, and wherein the second node and third node are child nodes of the first node, the method comprising:
   receiving a plurality of update requests for the B-tree;
   determining that two or more of the plurality of update requests fall into a range assigned to the second node;
   inserting the update requests determined to fall into the range assigned to the second node into the portion of the buffer associated with the second node;
   determining that two or more of the plurality of update requests fall into a range assigned to the third node;
   inserting the update requests determined to fall into the range assigned to the third node into the portion of the buffer associated with the third node;
   when a buffer limit of the first node has been reached or exceeded:
      flushing the portion of the buffer associated with the second node,
      modifying the second node with the update requests determined to fall into the range assigned to the second node, and
      transmitting the modified second node to a media storage device.

2. The method of claim 1, wherein
   the first node includes a map that indicates the range assigned the second node and the range assigned to the third node,
   determining that two or more of the plurality of update requests fall into the range assigned to the second node comprises using the map to determine that two or more of the plurality of update requests fall into the range assigned to the second node, and determining that two or more of the plurality of update requests fall into the range assigned to the third node comprises using the map to determine that two or more of the plurality of update requests fall into the range assigned to the third node.

3. The method of claim 2, wherein the map includes a reference to the second node and a reference to the third node.

4. The method of claim 3, wherein the reference to the second node is a pointer to the second node and the reference to the third node is a pointer to the third node.

5. The method of claim 3, wherein the reference to the second node is a unique identifier of the second node and the reference to the third node is a unique identifier of the third node.

6. The method of claim 1, wherein at least one of the plurality of update requests is a request for an insertion of a value into the B-tree.

7. The method of claim 1, wherein at least one of the plurality of update requests is a request for a deletion of a value from the B-tree.

8. The method of claim 1, wherein
the portion of the buffer that is associated with the second node includes a header that is associated with the second node, and
the portion of the buffer that is associated with the third node includes a header that is associated with the third node.

9. The method of claim 8 wherein
the header that is associated with the second node is an element identifier of the second node, and
the header that is associated with the third node is an element identifier of the third node.

10. The method of claim 1, further comprising:
receiving one or more further update requests; and
carrying out the flushing, modifying, and transmitting steps in response to a determination that inserting the one or more further update requests into the buffer would cause the buffer to reach or exceed the buffer limit.

11. The method of claim 1, wherein the processor hardware is part of a first computing device, the method further comprising receiving the plurality of update requests from a second computing device.

12. The method of claim 1, wherein the processor hardware is part of a first computing device, the method further comprising:
receiving one or more of the plurality of update requests from a second computing device; and
receiving one or more of the plurality of update requests from a third computing device,
wherein the update requests from the third computing device are different from those received from the second computing device.

13. The method of claim 1, wherein the method is carried out by a first process executing on the processor hardware and receiving the plurality of update requests comprises the first process receiving a message from a second process, wherein the message includes one or more of the plurality of update requests.

14. The method of claim 13, wherein the first and second processes both execute on the processor hardware.

15. The method of claim 13, wherein
the first process executes on the processor hardware, which is part of a first computing device,
the second process executes on processor hardware that is part of a second computing device, and
the second computing device is separate from the first computing device.

16. The method of claim 1, wherein
the second node is a branch node; and
modifying the second node comprises inserting the update requests determined to fall within the range assigned to the second node into a buffer of the second node.

17. The method of claim 1, wherein the second node is a leaf node and modifying the second node comprises modifying the values in the second node in accordance with the update requests determined to fall within the range assigned to the second node.

18. A method, carried out by processor hardware, of modifying a B-tree, wherein the B-tree includes a first node, a second node, and a third node, wherein the first node has an element identifier and a buffer, wherein the buffer includes a portion associated with the second node and a portion associated with the third node, and wherein the second node and third node are child nodes of the first node, the method comprising:
receiving a plurality of update requests for the B-tree;
determining that two or more of the plurality of update requests fall into a range assigned to the second node;
inserting the update requests determined to fall into the range assigned to the second node into the portion of the buffer associated with the second node;
determining that two or more of the plurality of update requests fall into a range assigned to the third node;
inserting the update requests determined to fall into the range assigned to the third node into the portion of the buffer associated with the third node;
creating a first copy of the first node, wherein the first copy
includes a reference to the second node and a reference to the third node,
has an element identifier that is different from the element identifier of the first node, and
has a buffer that includes a portion associated with the second node and a portion associated with the third node;
transmitting the first copy to a media storage device;
upon determining that a buffer limit of the first copy of the first node has been reached or exceeded:
flushing the portion of the buffer of the first copy of the first node associated with the second node,
modifying the second node with the update requests determined to fall into the range assigned to the second node;
creating a copy of the second node;
creating a second copy of the first node, wherein the second copy
includes a reference to the third node and a reference to the copy of the second node,
has an element identifier that is different from the element identifier of the first copy, and
has a buffer that includes a portion associated with the copy of the second node and a portion associated with the third node; and
transmitting the second copy of the first node and the copy of the second node to the media storage device.

19. The method of claim 18, wherein the first copy of the first node has a first transaction identifier and the second copy of the first node has a second transaction identifier.

20. A computing device that is in communication with a media storage device, the computing device comprising:
   local memory;
   processor hardware that carries out actions comprising:
      receiving a plurality of update requests for a B-tree, wherein
         the B-tree includes a first node, a second node, and a third node,
         the second node and the third node are child nodes of the first node,
         the first node has a buffer that includes a portion associated with the second node and a portion associated with the third node,
         the B-tree represents relationships among a plurality of entities of a database maintained by the media storage device;
      determining that two or more of the plurality of update requests fall into a range assigned to the second node;
      inserting the update requests determined to fall into the range assigned to the second node into the portion of the buffer associated with the second node;
      determining that two or more of the plurality of update requests fall into a range assigned to the third node;
      inserting the update requests determined to fall into the range assigned to the third node into the portion of the buffer associated with the third node;
      when a buffer limit of the first node has been reached or exceeded;
         flushing the portion of the buffer associated with the second node,
         modifying the second node with the update requests determined to fall into the range assigned to the second node, and
      transmitting the modified second node to a media storage device.

* * * * *